(12) United States Patent
Randall

(10) Patent No.: US 12,379,011 B2
(45) Date of Patent: Aug. 5, 2025

(54) ELECTRONIC MODAL BASE VALVE

(71) Applicant: Fox Factory, Inc., Duluth, GA (US)

(72) Inventor: Connor Randall, Salida, CO (US)

(73) Assignee: Fox Factory, Inc., Duluth, GA (US)

( * ) Notice: Subject to any disclaimer, the term of this patent is extended or adjusted under 35 U.S.C. 154(b) by 133 days.

(21) Appl. No.: 17/850,961

(22) Filed: Jun. 27, 2022

(65) Prior Publication Data

US 2022/0412426 A1 Dec. 29, 2022

Related U.S. Application Data

(60) Provisional application No. 63/215,793, filed on Jun. 28, 2021.

(51) Int. Cl.
*F16K 31/02* (2006.01)
*F16F 9/46* (2006.01)
*B62M 27/02* (2006.01)

(52) U.S. Cl.
CPC ............ *F16F 9/46* (2013.01); *F16K 31/02* (2013.01); *B62M 2027/026* (2013.01); *F16F 2222/12* (2013.01); *F16F 2228/066* (2013.01); *F16F 2230/18* (2013.01); *F16F 2232/08* (2013.01)

(58) Field of Classification Search
USPC ................ 251/129.11, 205, 210, 309, 310; 137/614.18, 614.2
See application file for complete search history.

(56) References Cited

U.S. PATENT DOCUMENTS

| 4,527,676 | A | 7/1985 | Emura et al. |
| 7,273,068 | B2 * | 9/2007 | Ballenger ............... F02C 9/263 137/554 |
| 7,690,397 | B2 * | 4/2010 | Hollis .................... F16K 11/076 251/310 |
| 7,699,289 | B2 * | 4/2010 | Peeters .............. D03D 47/3053 251/207 |
| 8,838,335 | B2 | 9/2014 | Bass et al. |
| 9,353,818 | B2 | 5/2016 | Marking |
| 9,682,604 | B2 | 6/2017 | Cox et al. |
| 9,797,467 | B2 | 10/2017 | Wootten et al. |
| 10,036,443 | B2 | 7/2018 | Galasso et al. |
| 10,415,662 | B2 | 9/2019 | Marking |
| 10,800,220 | B2 | 10/2020 | Ericksen et al. |
| 2004/0056229 | A1 * | 3/2004 | Biester .................... F16K 31/53 251/129.11 |

(Continued)

FOREIGN PATENT DOCUMENTS

| EP | 2410203 A2 | 1/2012 |
| WO | 2020089837 A1 | 5/2020 |

OTHER PUBLICATIONS

European Search Report for European Application No. 22181709.1, 10 Pages, Dec. 12, 2022.

*Primary Examiner* — Matthew W Jellett

(57) ABSTRACT

An electronic modal base valve is disclosed. The electronic modal base valve includes a motive component, a controller communicatively coupled with the motive component, and a control valve coupled with the motive component. The controller is configured to control an operation of the motive component, wherein a movement of the motive component is configured to cause the control valve to adjust a flow rate for a flow path through the electronic modal base valve.

18 Claims, 14 Drawing Sheets

(56) References Cited

U.S. PATENT DOCUMENTS

| | | | |
|---|---|---|---|
| 2004/0079913 A1* | 4/2004 | Lawson | A61B 5/0809 251/129.11 |
| 2007/0125975 A1* | 6/2007 | Jones | F16K 27/062 251/310 |
| 2021/0088100 A1 | 3/2021 | Woelfel | |
| 2021/0179226 A1 | 6/2021 | Santurbane et al. | |

* cited by examiner

ELECTRONIC MODAL BASE VALVE

CROSS-REFERENCE TO RELATED APPLICATIONS (PROVISIONAL)

This application claims priority to and benefit of U.S. Provisional Patent Application No. 63/215,793 filed on Jun. 28, 2021, entitled "ELECTRONIC MODAL DSC BASE VALVE" by Connor Randall, and assigned to the assignee of the present application, the disclosure of which is hereby incorporated by reference in its entirety.

FIELD OF THE INVENTION

Embodiments of the invention generally relate to an electronically adjustable shock assembly.

BACKGROUND

Shock assemblies are used in numerous different vehicles and configurations to absorb some or all of a movement that is received at a first portion of a vehicle before it is transmitted to a second portion of the vehicle. For example, when a front ski of a snowmobile hits a rough spot, the encounter will cause an impact force on the ski. However, by utilizing suspension components including one or more dampers, the impact force can be significantly reduced or even absorbed completely before it is transmitted to a user holding the handlebars of the vehicle.

Conventional shock assemblies provide a constant damping rate during compression or extension through the entire length of the stroke. As various types of recreational and sporting vehicles continue to become more technologically advanced, what is needed in the art are improved techniques for varying the performance characteristics of the shock assemblies.

BRIEF DESCRIPTION OF THE DRAWINGS

Aspects of the present invention are illustrated by way of example, and not by way of limitation, in the accompanying drawings, wherein.

Figure 1A:
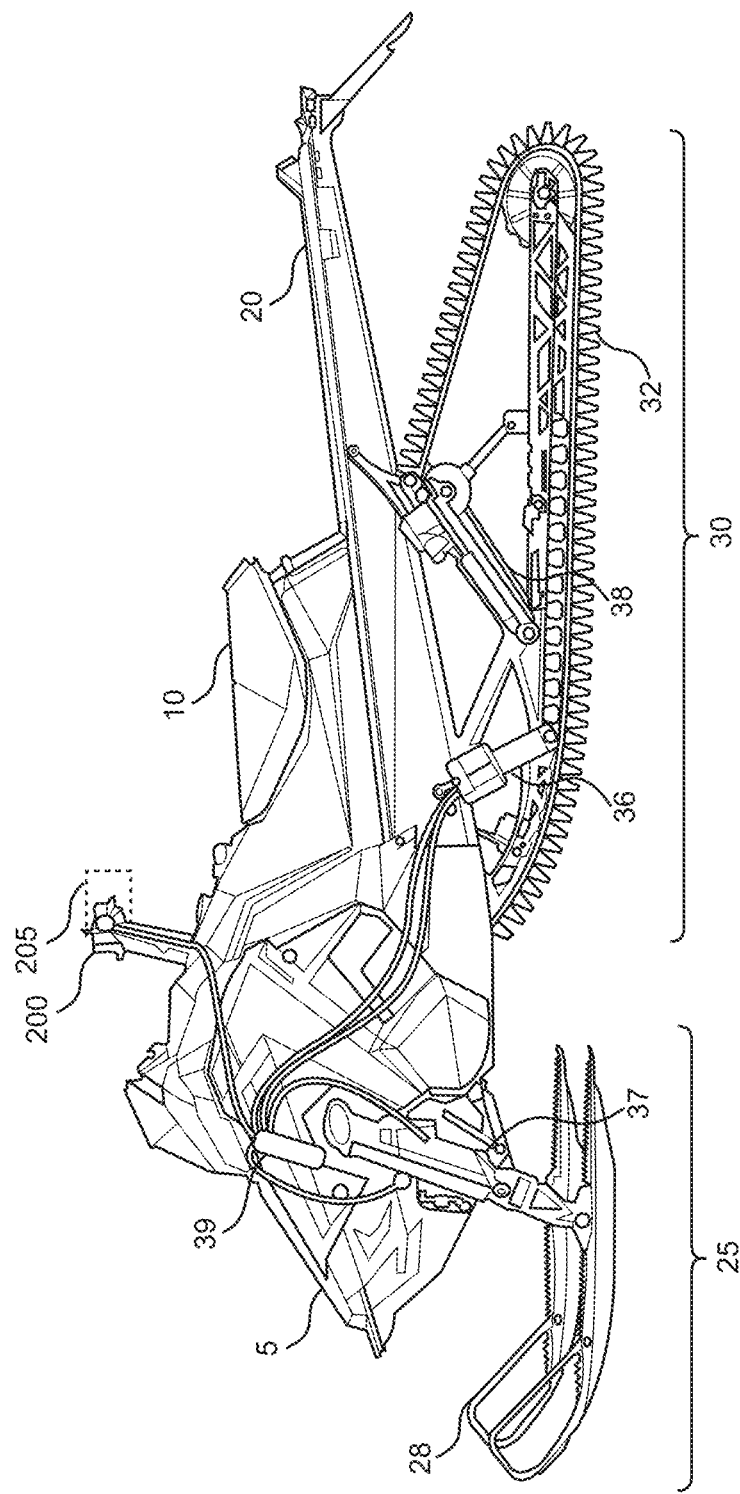
FIG. 1A is a perspective view of a snowmobile including a shock assembly with an electronic modal base valve, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Terminology

In the following discussion, a number of terms and directional language is utilized. Although the technology described herein is useful on a number of different suspension systems that use a shock assembly, a snowmobile is used in the following description for purposes of clarity.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, belt, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment.

However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

The term initial sag settings or "sag" refers to a predefined vehicle ride height and suspension geometry based on the initial compression of one or more shock assemblies of the suspension system for a given vehicle when it is within its normal load envelope configuration (e.g., with a rider/driver/user and any initial load weight). Once the sag is established for a vehicle, it will be the designated ride height of the vehicle, until and unless the sag is changed.

The initial sag for a vehicle is usually established by the manufacturer. The vehicle sag can then be modified and/or adjusted by an owner, a mechanic, or the like. For example, an owner can modify the sag to designate a new normal ride height based on a vehicle use purpose, load requirements that are different than the factory load configuration, an adjustment modification and/or replacement of one or more of the suspension components, a change in tire size, a performance adjustment, aesthetics, and the like.

In one embodiment, the initial manufacturer will use sag settings resulting in a pre-established vehicle ride height based on vehicle use, size, passenger capacity, load capacity, and the like. For example, a truck (side-by-side, car, bicycle, motorcycle, snowmobile, or the like) may have a pre-established sag based on an expected load (e.g., a number of passengers, an expected cargo requirement, etc.).

Regardless of the vehicle type, once the sag is established, in a static situation the ride height of the expectedly loaded vehicle should be at or about the established sag. When in motion, the ride height will change as the vehicle travels over the surface, and while the suspension system is used to reduce the transference of any input forces received from the surface to the rest of the vehicle it is also used to maintain the vehicle's sag. Additional information regarding sag and sag setup can be found in U.S. Pat. No. 8,838,335 which is incorporated by reference herein, in its entirety.

As vehicle utilization scenarios change, one or more shock assemblies of the suspension system can be adjusted for different characteristics based on the use type of the vehicle, terrain, purpose (e.g., rock crawl, normal use, race set-up, hill climb, etc.), and the like. This modification would result in a modified personal sag setting. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its personal sag setting as quickly as possible in preparation for the next encounter.

In contrast, a flat (or smooth terrain) rider would want a firmer suspension configuration with a very small range of motion to provide feel for the grip of the tire, maintain friction and/or aerodynamic geometries, and the like, in order to obtain the maximum performance from the vehicle.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a user of a snowmobile (or other rear-suspended vehicle) would often want to firm up and even lockout the suspension component coupled with the rear track to traverse deep snow (or sand, gravel, etc.), to main the connection between the terrain and the tread (or other drive component).

With respect to the term lockout, for purposes of the following discussion, lockout refers to the most restricted flow state attainable or desirable. Thus, in one embodiment, lockout refers to a stoppage of all fluid flow through a given flow path. However, in another embodiment, lockout does not stop all the fluid flow through a given flow path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the adjustable shock assembly has been reduced to a minimum size for a given adjustable shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

The term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used.

Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). In many instances, an "active" valve is adjusted or manipulated electronically (e.g., using a powered solenoid, electric motor, poppet, or the like) to alter the operation or characteristics of a valve and/or other component. As a result, in the field of suspension components and valves, the terms "active", "electronic", "electronically controlled", and the like, are often used interchangeably.

The term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle.

Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

In the following discussion, an electronically adjustable component may be active and/or semi-active. In general, the electronically adjustable component will have one or more electronically adjustable features controlled by a motive component such as a solenoid, stepper motor, electric motor, or the like. In operation, the electronically adjustable component will receive an input command which will cause the motive component to move, modify, or otherwise change one or more aspects of one or more electronically adjustable features.

In general, a dual speed compression (DSC) base valve provides compression adjustability that includes a low-speed compression (LSC) adjuster (or adjustment capability) and a high-speed compression (HSC) adjuster (or adjustment capability).

LSC primarily affects the compression damping during slow suspension movements such as G-outs, smooth jump landings, and the like. It also affects ride comfort of the vehicle. While the LSC settings can be dependent upon use conditions, rider preference, performance requirements, etc., general tuning parameters usually mean an LSC setting that provides good body control for anti-roll in corners, without causing excessive harshness or loss of front end traction.

HSC primarily affects the compression damping during medium-to-fast suspension movements such as steep jump faces, harsh flat landings, aggressive whoops, and the like. While the HSC settings can be dependent upon use conditions, rider preference, performance requirements, etc., general tuning parameters usually mean using as little HSC damping as possible without allowing bottom-out to occur.

In one embodiment, a manual command lockout capability is a rotary spool type base valve. In one embodiment, the manual command lockout capability is a check shim type base valve architecture. In one embodiment, the manual command lockout base valve is a stand-alone valve. In one embodiment, the manual command lockout feature is added to a quick switch base valve architecture.

For purposes of clarity, in the following discussion, a base valve with manual command lockout capability is referred to hereinafter as a "modal base valve."

Although discussed in an embodiment of a rear shock assembly, the modal base valve may be used in other active valve suspensions and components, to include compression valves, rebound valves, as well as other hydraulic applications such as front shock assemblies and the like. Embodiments of different active valve suspension and components where the modal base valve may be utilized are disclosed in U.S. Pat. Nos. 8,838,335; 9,353,818; 9,682,604; 9,797,467; 10,036,443; 10,415,662; the content of which are incorporated by reference herein, in their entirety.

Operation

Referring now to FIG. 1A, a perspective view of a snowmobile 50 with a shock assembly having a modal base valve (e.g., rear track shock assembly 38 with modal base valve 500) is shown in accordance with an embodiment. Although a snowmobile 50 is used in the discussion, the modal base valve disclosed herein is also suited for use in one or more shock assemblies on other vehicles such as, but not limited to a bicycle, an electric bike (e-bike), a hybrid bike, a scooter, a motorcycle, an ATV, a personal water craft (PWC), a vehicle with three or more wheels (e.g., a UTV such as a side-by-side, a car, truck, etc.), an aircraft, and the like. In one embodiment, the modal base valve disclosed herein is also suited for use in one or more shock assemblies of a suspension inclusive device such as, but not limited to, an exoskeleton, a seat frame, a prosthetic, a suspended floor, and the like. However, in the following discussion, and for purposes of clarity, a snowmobile 50 is utilized as the example vehicle.

In general, snowmobile 50 includes a frame 5, seat 10, tail section 20, handlebars 200, front steering assembly 25, rear suspension assembly 30, and a track 32 driven by the engine of the vehicle and supported by the rear suspension assembly 30.

In one embodiment, front steering assembly 25 includes front skis 28 and front shock assemblies 37. In one embodiment, rear suspension assembly 30 includes a front track connection with front track shock assembly 36, a rear track connection with a rear track shock assembly 38.

In one embodiment, snowmobile 50 includes one or more electronically actuated components, interactive components, and/or control features such as one or more of: user interface 205, active and/or semi-active shock assemblies (e.g., front track shock assembly 36, rear track shock assembly 38, and front shock assemblies 37), controller 39, one or more sensor(s), a display, a power source, smart components, and the like.

In general, the one or more sensor(s) could be used to monitor and/or measure things such as temperature, voltage, current, resistance, noise (such as when a motor is actuated, fluid flow through a flow path, engine knocks, pings, etc.), positions of one or more components of snowmobile 50 (e.g., shock positions, ride height, pitch, yaw, roll, etc.), and the like. In one embodiment, the one or more sensor(s) could be forward looking terrain, vibrations, bump, impact event, angular measurements, and the like.

Additional information for vehicle suspension systems, sensors, and their components as well as adjustment, modification, and/or replacement aspects including manually, semi-actively, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

In one embodiment, one or a plurality of component(s) of snowmobile 50 are also smart component(s). In one embodiment, the smart component(s) will include connective features that allow them to communicate wired or wirelessly with one or more of the electronically actuated components, interactive components, control features, and/or the like.

In one embodiment, data (including real-time data) is collected or provided from the smart component(s), electronically actuated components, interactive components, control features, and/or the like to the controller 39. Depending upon the connected component, the data may be location data, sensor data, telemetry data, and the like. In general, telemetry data can include data such as angle, orientation, velocity, acceleration, RPM, operating temperature, and the like.

Figure 1B:
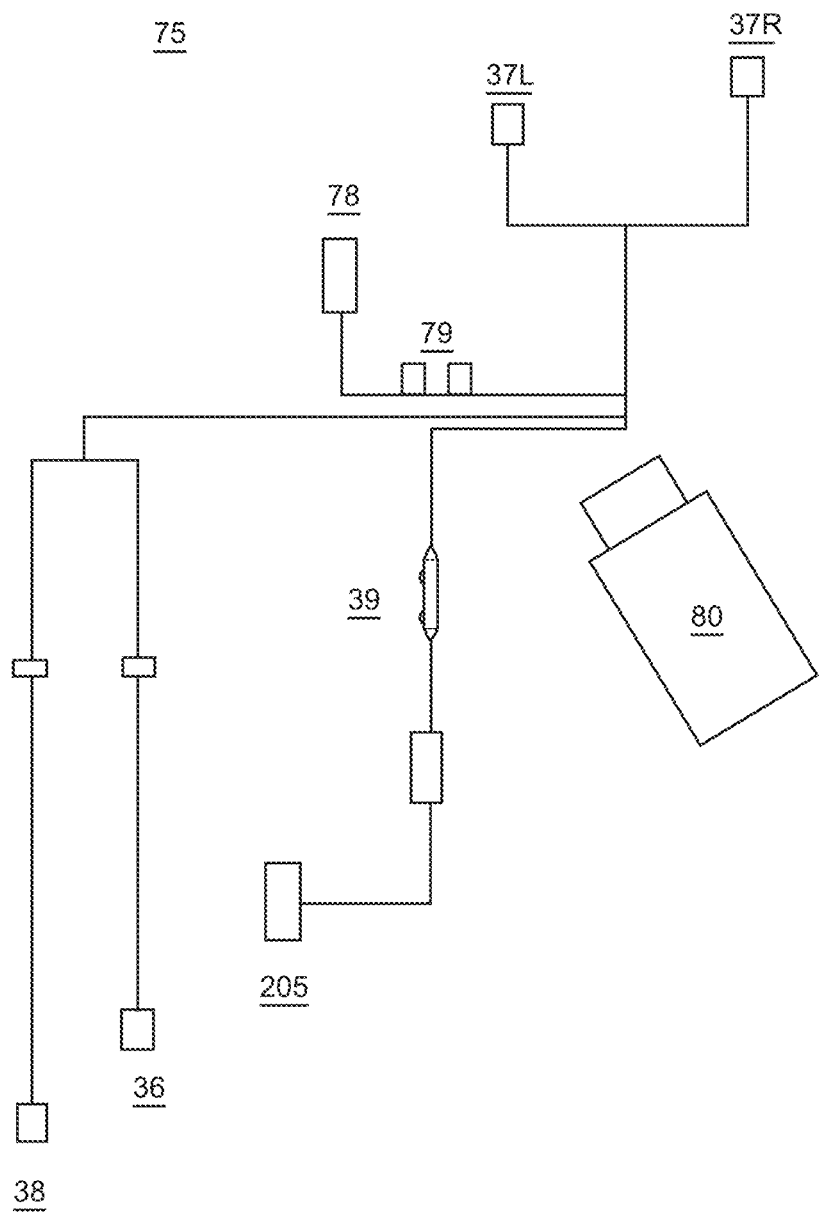
FIG. 1B is a schematic diagram of one or more electronically actuated components, interactive components, and/or control features, in accordance with an embodiment.

Referring now to FIG. 1B, a schematic diagram 75 of one or more electronically actuated components, interactive components, and/or control features of snowmobile 50 is shown in accordance with an embodiment.

In one embodiment, schematic diagram 75 includes an ECU 80, controller 39, user interface 205, fuse 79, power supply 78, a left front ski active valve shock assembly 37L, a right front ski active valve shock assembly 37R, front track active valve shock assembly 36, and modal base valve rear track shock assembly 38.

In one embodiment, snowmobile 50 can include all of the components shown in schematic diagram 75. For example, in a snowmobile 50 with a fully active suspension setup including the FOX intelligent quick switch (iQS) system, a plurality of active valve shock assemblies, and modal base valve rear track shock assembly 38.

In one embodiment, snowmobile 50 will only include some of the components shown in schematic diagram 75. For example, in a snowmobile 50 with a partially active suspension setup including the FOX intelligent quick switch (iQS) system, at least one active valve shock assembly, and a modal base valve rear track shock assembly 38.

In one embodiment, snowmobile 50 will only include a limited number of the electronically actuated components, interactive components, and/or control features shown in schematic diagram 75. For example, a snowmobile 50 might only include user interface 205 and modal base valve rear track shock assembly 38 where the only setting that is electronically adjustable is the lockout setting. Any other adjustable settings would be manually input by a user such as via a knob, lever, etc.

Wired

In one embodiment, there is a wired communication connection (such as via a wiring harness or the like) between the one or more electronically actuated components, interactive components, and/or control features of schematic 75. For example, in one embodiment, modal base valve be coupled with user interface 205 (and/or controller 39, sensors, or other components such as, but not limited to, those shown in schematic 75) via a wiring harness and any adjustable aspect inputs received at the modal base valve (e.g., the changing of the compression tunes, rebound tunes, and/or the manual lockout) would be received over the wired connection.

In one embodiment, power might also be received over the wired connection. For example, the motor (solenoid, or the like) that operates modal base valve would receive its power from a power source coupled with the wiring harness (e.g., the snowmobile power supply 78, a power supply incorporated with user interface 205, a power supply coupled with any of the shock assemblies, a reserve or extra power supply for auxiliary components, or the like).

Although shown in certain locations in FIGS. 1A and 1B, in accordance with one embodiment, in other embodiments, one, some, or all of the components shown in FIGS. 1A and/or 1B could be located in other locations. For example, one, some, or all of the components could be located on the sides of components, at the handlebars, at a foot peg (or footwell), carried by the rider if it is wireless, located on a mount attached to a portion of the snowmobile 50, etc. Thus, the use of the locations of components as shown in FIGS. 1A and 1B are indicative of one embodiment, which is provided for purposes of clarity.

Wireless

In one embodiment, there is wireless communication connectivity between the one or more electronically actuated components, interactive components, and/or control features of schematic 75. For example, in one embodiment, modal base valve be in wireless communication with user interface 205 (and/or controller 39, sensors, or other components such as, but not limited to, those shown in schematic 75) without requiring a wiring harness and any adjustable aspect inputs received at the modal base valve (e.g., the changing of the rebound tunes, compression tunes, and/or the manual lockout) would be received over the wireless connection.

In one embodiment, of the wireless connectivity, modal base valve and/or rear track shock assembly 38 would include its own power source and the motor (solenoid, or the like) that operates modal base valve would receive its operating power therefrom. In other words, the modal base valve and/or rear track shock assembly 38 would be a self-contained unit which would be able to receive and carry out changes transmitted from user interface 205.

Hybrid Wired and Wireless

In one embodiment, the communications between the one or more electronically actuated components, interactive components, and/or control features of schematic 75 is a combination of wired and wireless connectivity.

For example, in one embodiment, modal base valve be in wireless communication with user interface 205 (and/or controller 39, sensors, or other components such as, but not limited to, those shown in schematic 75) and any adjustable aspect inputs received at the modal base valve (e.g., the changing of the rebound tunes, compression tunes, and/or the manual lockout) would be received over the wireless connection. However, the motor (solenoid, or the like) that operates modal base valve would receive its power from a power source via a wiring harness (e.g., the snowmobile power supply 78, a power supply incorporated with user interface 205, a power supply coupled with any of the shock assemblies, a reserve or extra power supply for auxiliary components, or the like).

In another embodiment, the compression adjustment modes provided from iQS switch 210 (and/or controller 39, sensors, or other components such as, but not limited to, those shown in schematic 75) to modal base valve may be received via a wired connection, while the manual lockout aspects of modal base valve would be provided wirelessly from manual lockout communications component 220.

In one embodiment, the motor (solenoid, or the like) that operates modal base valve would receive its power from a power source via a wiring harness (e.g., the snowmobile power supply 78, a power supply incorporated with user interface 205, a power supply coupled with any of the shock assemblies, a reserve or extra power supply for auxiliary components, or the like).

In another embodiment, modal base valve and/or rear track shock assembly 38 would include its own power source and the motor (solenoid, or the like) that operates modal base valve would receive its operating power therefrom.

In another embodiment, the compression adjustment modes from iQS switch 210 (and/or controller 39, sensors, or other components such as, but not limited to, those shown in schematic 75) would be provided wirelessly to modal base valve, while the manual lockout aspects of modal base valve would be provided via a wired connection with manual lockout communications component 220.

In one embodiment, the motor (solenoid, or the like) that operates modal base valve would receive its power from a power source via the wiring harness (e.g., the snowmobile power supply 78, a power supply incorporated with user interface 205, a power supply coupled with any of the shock assemblies, a reserve or extra power supply for auxiliary components, or the like).

In another embodiment, modal base valve and/or rear track shock assembly 38 would include its own power source and the motor (solenoid, or the like) that operates modal base valve would receive its operating power therefrom.

Figure 2:
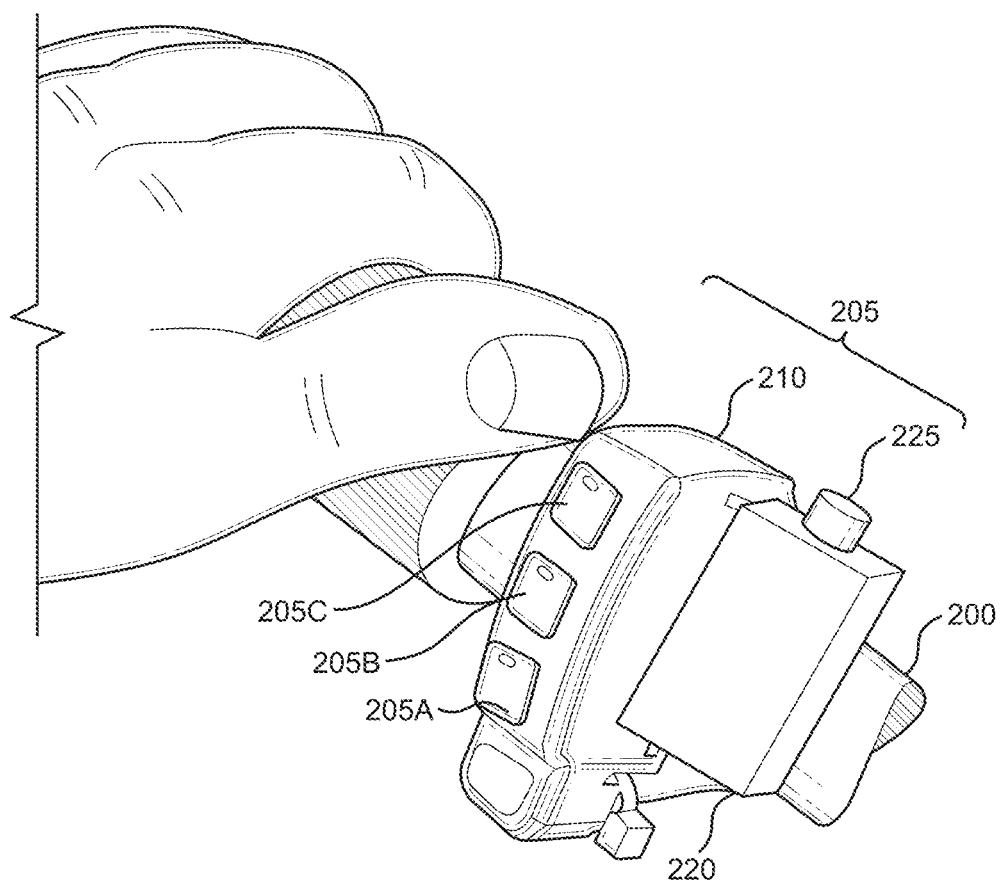
FIG. 2 is a perspective view of a user interface for the electronic modal base valve, in accordance with an embodiment.

With reference now to FIG. 2, a perspective view of a user interface 205 is shown in accordance with an embodiment. In one embodiment, user interface 205 is provided in a location convenient for user manipulation during vehicle operation. In one embodiment, user interface 205 is provided on the handlebar of the snowmobile 50 (or other part of snowmobile 50 that is reachable during use). In one embodiment, user interface 205 is coupled with handlebar 200 via a clip or other retaining device. In one embodiment, user interface may be, but is not limited to, a voice activation device, a GPS device having stored map, a smart phone, smart device, lever, button, or the like. Moreover, although the user interface 205 is shown coupled with handlebar 200.

In another embodiment, the user interface 205 could be located on another portion of the snowmobile frame 119, on a mount coupled with the vehicle, worn as a smart device, carried by the rider, or the like.

In one embodiment, such as when snowmobile 50 is minimally upgraded with a modal base valve rear track shock assembly 38, user interface 205 will only include manual lockout communications component 220 with a manually operated button 225 (or switch, knob, lever, trigger, or the like) the operation of which allows the user to remotely lock/unlock the rear track shock assembly 38 at will. It should be understood that in an embodiment, there may be only a single control, or in an embodiment there may be a set of controls.

In one embodiment, when the user interacts the user interface 205, a signal is sent from the user interface 205 to the modal base valve 500. For example, when button 225 is operated by a user, manual lockout communications component 220 will send a signal to the modal base valve of rear track shock assembly 38. In one embodiment, the signal will either cause the manual lockout of modal base valve to move to a locked out state, thereby locking out the rear track shock assembly 38, or it will cause the manual lockout of modal base valve to move to a non-locked out state, thereby releasing the rear track shock assembly 38 from being manually locked out.

In one embodiment, communications component 220 will provide wireless communications between the user interface 205 and the modal base valve rear track shock assembly 38. In one embodiment, communications component 220 will provide a wired communication between the user interface 205 and the modal base valve rear track shock assembly 38.

In one embodiment, such as, for example, when snowmobile 50 has a fully (or partially) active suspension setup with the modal base valve rear track shock assembly 38, user interface 205 will include an iQS switch 210 and manual lockout communications component 220 with button 225 (or switch, knob, lever, etc.). In one embodiment, iQS switch 210 includes a number of buttons 205A-205C. Although three buttons are shown, this is indicative of one embodiment and is shown for purposes of clarity.

In one embodiment, such as for example, when the iQS switch 210 is providing wireless communications with one or more shock assemblies (or other components), manual lockout communications component 220 with button 225 may be integrated with iQS switch 210 as a single component or within a single housing. For example, in one embodiment, if iQS switch 210 is providing wireless communications with one or more shock assemblies (or other components), manual lockout communications component 220 could be used alone or in conjunction with one of the three button positions.

In one embodiment, wired or wireless iQS switch 210 stores one or more programable (or preset) compression setting tune(s) that, when selected, cause the shock assembly characteristics to be changed on the fly. In one embodiment, the shock assembly characteristics are changed via a quick switch (QS) DSC base valve (e.g., a tool-free adjuster that provides on the fly shock assembly adjustment capabilities. In one embodiment a different programable (or preset) compression setting tune is accessed by each of the three buttons, e.g., buttons 205A-205C.

In general, different selectable compression setting tunes can provide different compression stroke characteristics for the shock assembly. In one embodiment, the different compression setting tunes can make large, medium, and/or small changes to the compression stroke characteristics of the shock assembly. For example, one tune might be a softest compression setting, while another tune is a lockout compression setting.

For example, in one embodiment, button 205A would be a soft mode, e.g., a shock assembly tune designed for maximum trail comfort, easy side hilling and descending. In one embodiment, button 205B would provide another tune such as a middle mode (e.g., a shock assembly tune designed for balanced all-around performance), a firm mode (e.g., a shock assembly tune designed for aggressive trail riding, increased load carrying capacity, etc.), or the like. In one embodiment, button 205C would cause the lockout to be engaged (or disengaged). In one embodiment, when the iQS switch 210 is wireless and the manual lockout is integrated with the iQS switch 210 button 205C would engage the manual lockout.

In another embodiment, with respect to the three button example, (or any number of buttons/switches/levers/etc. which could also have more than one tune associated therewith depending upon length of push, number of times pushed, etc.) button 205A would be a soft mode, e.g., a shock assembly tune designed for maximum trail comfort, easy side hilling and descending. In one embodiment, button 205B would provide a middle mode, e.g., a shock assembly tune designed for balanced all-around performance. In one embodiment, button 205C would provide a firm mode, e.g., a shock assembly tune designed for aggressive trail riding, increased load carrying capacity, and the like. In one embodiment, if the user holds down a button (such as button 205C for an extended period), or pushes it a predefined number of times within a given time period, the lockout will be engaged (or disengaged).

In one embodiment, if a plurality of the shock assemblies are active shock assemblies the adjustments made by the different tunes could be different for one or more of the different shock assemblies. In the following example, all four shock assemblies are active shock assemblies (however, it should be appreciated that if less than all four are active, the above example, would be similarly applied to the active shock assemblies of the system).

In one embodiment, in a soft mode, each of the front shock assemblies 37, the front track shock assembly 36, and the rear track shock assembly 38 would be in a soft tune configuration. In one embodiment, in a middle mode, each of the front shock assemblies 37, the front track shock assembly 36, and the rear track shock assembly 38 would be in a middle tune configuration. In one embodiment, in a firm mode, each of the front shock assemblies 37 and the front track shock assembly 36 would be in a firm tune configuration while the rear track shock assembly 38 would be in a middle tune configuration. In one embodiment, in a lockout mode, each of the front shock assemblies 37 would be in a soft tune configuration, the front track shock assembly 36 would be in a middle tune configuration, and the rear track shock assembly 38 would be locked out.

Although the above example provides a number of different tunes per shock assembly, it should be appreciated that in another embodiment, a user (and/or manufacturer, after market provider, suspension tuner, mechanic, etc.) would be able to set up the same or different configurations for one or more of the shock assemblies for each mode. The differences could be due to user skill, terrain type, ride format (e.g., work, fun, race, thrill, extreme, etc.), loaded weight, altitude, temperature, etc.

In one embodiment, the different tunes can be predefined for a given vehicle to cover different performance characteristics such as, but not limited to, smooth ride, fast ride, bumpy ride, hill climb, hill descent, and the like. In one embodiment, the different tunes may be modified by the user for more personalized performance based on aspects such as, but not limited to, user skill, user body type, the vehicle, components on the vehicle, other suspension settings on the vehicle, location of operation, terrain type, weather, temperature, etc. In one embodiment, the tunes may be downloaded from a user's computer, mobile device, etc. In one embodiment, the tunes may be obtained via a suspension tune application, library, or the like as described in U.S. patent application Ser. No. 17/388,401, which is incorporated herein by reference in its entirety.

In one embodiment, selecting one of the compression setting tunes causes the DSC base valve to make quick, reversable, and repeatable compression damping changes in real-time (or near-real time) which will change vehicle ride quality, performance, and/or handling. Moreover, the DSC base valve makes the compression damping changes without requiring the complications of counting clicks, or the like.

Rebound Adjustment

In one embodiment, rear track shock assembly 38 will also have an adjustable rebound damping valve. In one embodiment, the rear track shock assembly 38 would include a manually adjustable rebound damping valve 393. In one embodiment, the rear track shock assembly 38 would include a wired and/or wireless active rebound damping valve 393. In one embodiment, the active rebound damping valve 393 could be located on the eyelet/shaft of rear track shock assembly 38. In one embodiment, the wireless electronic modal base valve 500 may act as both the adjustable compression valve (e.g., a DSC valve) and the adjustable rebound damping valve 393.

In general, rebound damping is used to control how quickly the shock extends (rebounds) after a compression stroke. That is, rebound damping dissipates stored system spring energy after a suspension compression event and results in a controlled rate of return of the suspension to a more extended condition.

Preventing the suspension from rebounding too quickly is important to proper shock assembly operation. In the case of rear suspension, an improper amount of rebound damping can result in the rear of the vehicle "kicking" off the ground and pitching the rider forward after encountering a bump or sharp compression obstacle, also known as "bucking." In the case of front suspension, an improper amount of rebound damping can cause impact to the rider's hands as the front suspension kicks back directly toward the rider.

Conversely, preventing the suspension from rebounding too slowly is also important to proper shock assembly operation. An improper amount of rebound damping, where the amount of damping is too high, can result in the suspension not returning quickly enough to respond to the next bump in a series of bumps, ultimately causing the suspension to "ratchet" down into a compressed state. Such a "ratcheting" sequence is commonly referred to as suspension packing. Packing can result in the suspension being overly stiff due to retained compression through the middle to the end of a series of bumps, causing the back of the vehicle to kick off the ground and pitch the rider forward (in the case of the rear suspension) and causing the suspension to get overly stiff and steering geometry to get steep and unstable (in the case of the front suspension). If not corrected, suspension packing can result in damage and/or failure of the shock assembly.

In one embodiment, user interface 205 might include a rebound interface included with or similar to the iQS switch 210. In one embodiment, the rebound interface would include a number of different rebound tunes that could be used to make rebound adjustments to rebound damping valve 393 of rear track shock assembly 38. In one embodiment, the rebound interface would include a number of different rebound tunes that could be used to make rebound adjustments to a rebound damping valve 393 on one, some, or all of the shock assemblies of snowmobile 50. In one embodiment, one, some, or all of the shock assemblies of snowmobile 50 could include wired rebound damping valve 393 adjustability. In one embodiment, one, some, or all of the shock assemblies of snowmobile 50 could include wireless rebound damping valve 393 adjustability. In one embodiment, the shock assemblies of snowmobile 50 could include a combination of wired and wireless rebound damping valve 393 adjustability.

In one embodiment, any of the shock assemblies of snowmobile 50 with wired and/or wireless rebound damping valve 393 adjustability could be controlled by the user interface 205 such as, for example, iQS switch 210.

For example, using the above iQS switch 210 compression example. In one embodiment, with respect to the three button example, (or any number of buttons/switches/levers/etc. which could also have more than one tune associated therewith depending upon length of push, number of times pushed, etc.) button 205A would be a soft mode compression tune which would also provide a softest rebound setting tune, e.g., a tune with a smallest amount of rebound damping designed for a ride condition such as a rough trail and/or chatter. In one embodiment, button 205B would provide a middle mode compression tune which would also provide a medium rebound setting tune, e.g., a tune with a medium amount of rebound damping designed for variable terrain and trail conditions (e.g., a best all-around rebound setting). In one embodiment, button 205C would provide a firm compression tune which would also provide a firm rebound setting tune, e.g., a tune with a large amount of rebound damping designed for high-speed groomed trails, smooth terrain, flat tracks, race tracks, road courses, etc. In one embodiment, if the user holds down a button (such as button 205C for an extended period), or pushes it a predefined number of times within a given time period, the lockout will be engaged (or disengaged).

Figure 3A:
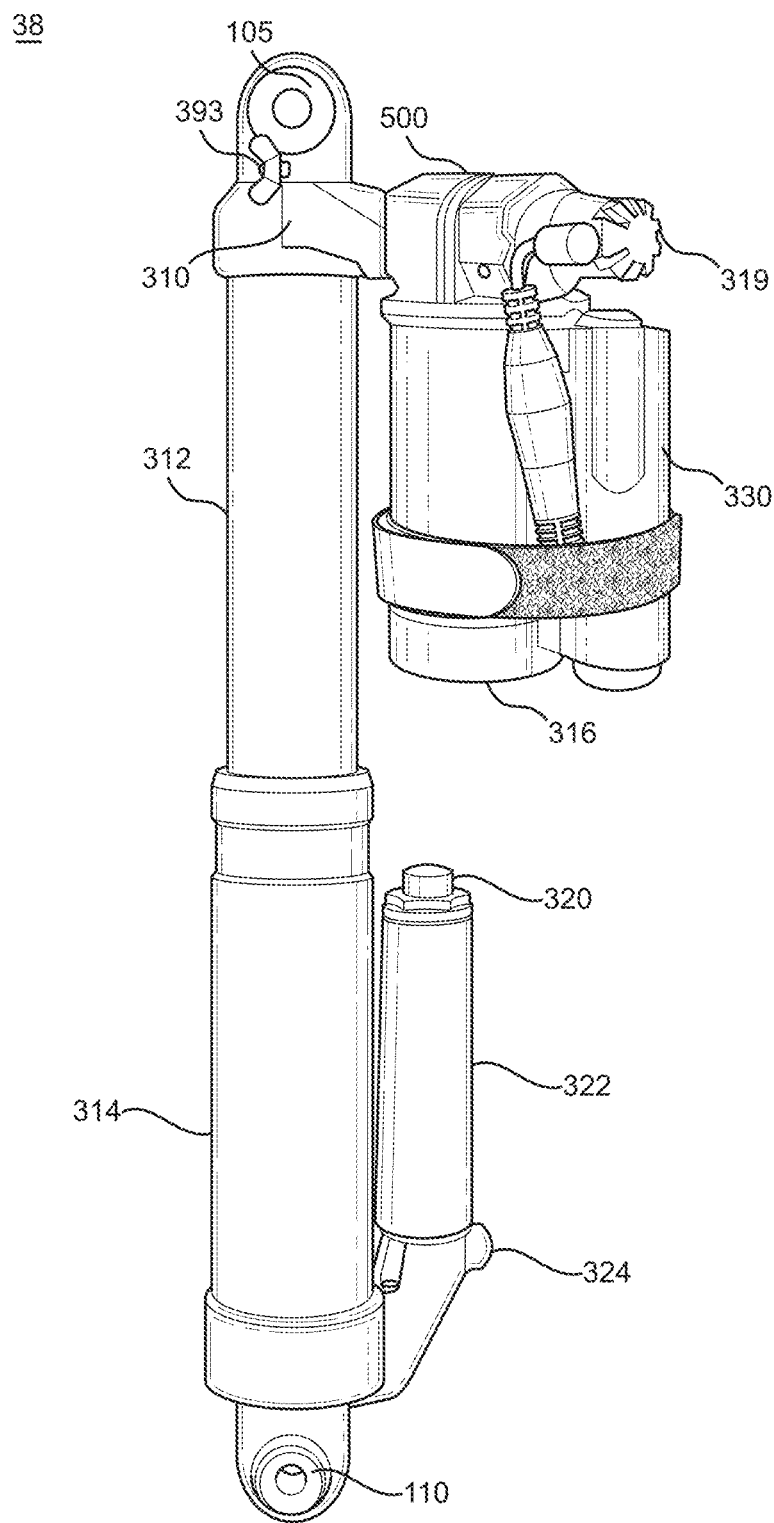
FIG. 3A is a perspective view of the shock assembly with a wireless electronic modal base valve, in accordance with an embodiment.

Referring now to FIG. 3A, a perspective view of rear track shock assembly 38 with a wireless electronic modal base valve 500 is shown in accordance with an embodiment. In one embodiment, the rear track shock assembly 38 is a FOX load optimizing air technology (FLOAT) air shock assembly with a reservoir (hereinafter "air shock assembly"). In general, the air shock assembly is a high-performance shock assembly that use air as springs, instead of heavy steel coil springs or expensive titanium coil springs.

In general, rear track shock assembly 38 includes attachment features such as, in one embodiment, a chassis mount (e.g., upper eyelet 105) and a rear suspension mount (e.g., lower eyelet 110) which allow the rear track shock assembly 38 to be coupled between the unsprung portion of the suspension (e.g., the framework and components of the rear suspension between track 22 and the terrain) and the frame 5.

In one embodiment, rear track shock assembly 38 includes body 312, an expansion component (e.g., main air chamber 314) providing some type of expansive (or spring) force on rear track shock assembly 38, and a main air valve 324 for adding or removing air from main air chamber 314. In one embodiment, the rear track shock assembly 38 also includes body cap 310, and a reservoir 316 fluidly coupled with the body 312.

In one embodiment, rear track shock assembly 38 includes an adjustable rebound damping valve 393. In one embodiment, the components shown as being associated with rear track shock assembly 38 may also be included in one or more other active and/or semi-active shock assemblies, such as one or both of front shock assemblies 37, and front track shock assembly 36.

Figure 4A:
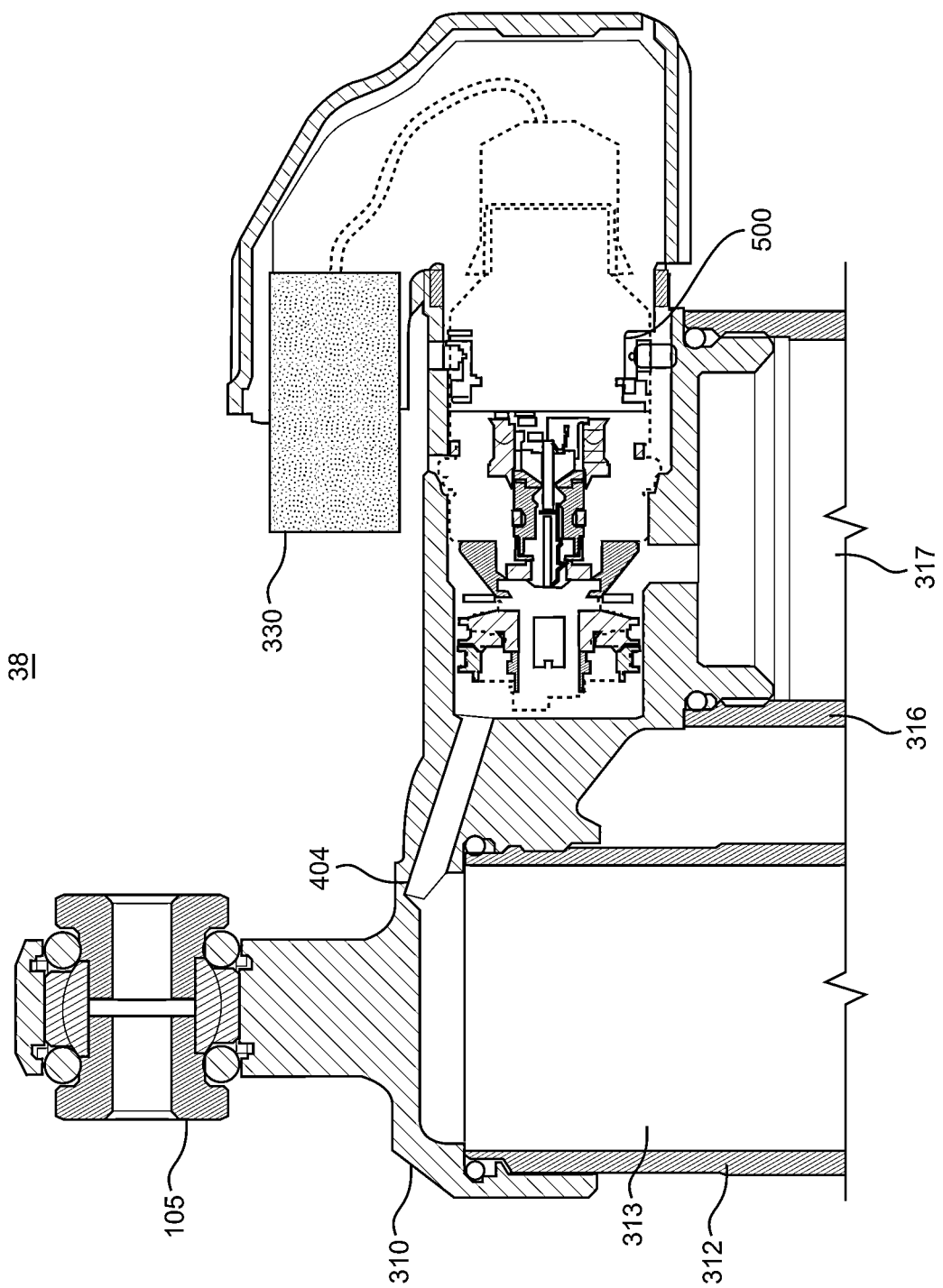
FIG. 4A is a cross-section view of a portion of the shock assembly with the electronic modal base valve illustrating the location of the electronic modal base valve, in accordance with an embodiment.

Referring now to FIG. 4A, a cross-section view of the top portion of the rear track shock assembly 38 with the electronic modal base valve 500 of FIG. 3A, illustrating the location of the electronic modal base valve 500 and an optional location for wireless controller 330 is shown in accordance with an embodiment. In one embodiment, the cross-sectional view also shows a portion of the chamber 313 of body 312 that holds the working fluid, a portion of the reservoir chamber 317 of reservoir 316 that holds the working fluid, and the flow path 404 in the body cap 310 therebetween. In addition, the electronic modal base valve 500 for controlling the flow rate is shown within flow path 404.

Referring now to FIG. 3A and 4A, in one embodiment, body 312 has an internal chamber 313 filled with a working fluid (e.g., high viscosity index shock oil, etc.), an expansion component (e.g., main air chamber 314) providing some type of expansive (or spring) force on rear track shock assembly 38, a main air valve 324 for adding or removing air from main air chamber 314, and a piston coupled with a piston shaft, where the piston is located somewhere within the internal chamber 313 of body 312. In one embodiment, when installed, the resting length of the mounted rear track shock assembly 38 is maintained in compression by the weight of the body it is suspending (e.g., the sprung portion of snowmobile 50), and in expansion by the "spring" force produced by the expansion component (e.g., main air chamber 314).

In one embodiment, reservoir 316 is fluidly coupled with the body 312 via a flow path(s) 404 through body cap 310. In one embodiment, the reservoir 316 has a reservoir chamber 317 that is divided by an internal floating piston (IFP). In one embodiment, one side of the IFP divided reservoir chamber 317 is filled with a pressurized gas (e.g., nitrogen, or the like) and the other side of reservoir chamber 317 is fluidly coupled with chamber 313 of body 312 via flow path 404 and contains working fluid. In general, the IFP keeps the pressurized gas from mixing with the working fluid and/or reaching the flow path 404.

In operation, when the vehicle encounters a bump, rear track shock assembly 38 is compressed causing the piston and piston shaft to move further into chamber 313 of body 312 (e.g., the compression stroke). After the compression stroke, the expansion component (e.g., main air chamber 314) which was compressed by body 312 moving thereinto, acts to push body 312 back out of the main air chamber 312, causing the piston and piston shaft to move back toward their original location within the chamber 313 of body 312 (e.g., the rebound stroke).

During the compression stroke, some of the working fluid in chamber 313 of body 312 is displaced (due to the reduced volume within chamber 313 of body 312 caused by the incursion of the piston shaft). This displaced working fluid will flow from chamber 313 of body 312 through the flow path 404 in the body cap 310 to the reservoir chamber 317. As the working fluid fills the reservoir chamber 317, it will cause the IFP to move further into reservoir chamber 317 causing the pressurized gas to be further compressed, and in so doing, ensure consistent, fade-free damping in most riding conditions.

In one embodiment, the modal base valve 500 is located in the body cap 310 flow path 404 between the chamber 313 of body 312 and the reservoir 316. In one embodiment, modal base valve 500 is used to control the flow rate of the working fluid through the flow path 404 during the compression stroke. Thus, making an adjustment to the modal base valve 500 will change the flow rate of the working fluid flowing through flow path 404 causing a corollary adjustment of one or more damping characteristics of the rear track shock assembly 38 during the compression stroke.

In one embodiment, modal base valve 500 receives adjustment input(s) from user interface 205. In one embodiment, modal base valve 500 receives adjustment input(s) from a compression adjuster knob 319. In one embodiment, modal base valve 500 receives adjustment input(s) from user interface 205 and compression adjuster knob 319.

In one embodiment, rear track shock assembly 38 includes an optional extra volume (Evol) chamber 322 with an Evol air valve 320 (similar in function to main air valve 324 described herein). In one embodiment, the Evol chamber 322 allows the available air volume of main air chamber 314 of rear track shock assembly 38 to be changed on the fly, e.g., while the vehicle is in operation. In one embodiment, the change in available air volume can be performed by a user manually adjusting a lever (turning a knob, or the like) on rear track shock assembly 38 or in another location that is communicatively coupled with, but possibly remote from, the rear track shock assembly 38 such that it is easier for a user to reach while operating the vehicle (e.g., iQS switch 210).

In one embodiment, the change in available air volume is controlled by a user providing an input electronically (e.g., via an electronic connection such as iQS switch 210 on the handlebars, or the like) over a wired or wireless connection. In one embodiment, the change is controlled automatically by a control system on or connected with the vehicle. In one embodiment, the change to the air volume can be controlled by an automated system, while also receiving control inputs from the user manually and/or electronically.

In one embodiment, by using a main air chamber 314 and the Evol chamber 322, the air spring style rear track shock assembly 38 is lightweight and progressive. The progressive aspect occurs during the increase in spring force and travel. For example, as the air shock is compressed in a compression stroke, the spring force increase is provided by the body 312 reducing the volume of the main air chamber 314 which compresses the air therein. As the air shock is further compressed (such as during the second half of the shock travel or wherever the tuned air shock assembly is set to begin using the Evol chamber), the Evol chamber can be used to add to the spring force increase being generated by the additional compression of the air in the main air chamber 314. Thus, as the air shock travel through its compression range, the spring force will build progressively, such that any harsh bottoming of the suspension is virtually eliminated thereby providing a "bottomless" feel.

Moreover, because the main air chamber 314 and Evol chamber 322 are separated, they can be independently tuned. However, since they also work together in the described progressive fashion, the range of the combined tuning is greater than that of either alone. Thereby providing adjustability for performance across a wide variety of terrain, riding style, and user weights.

In general, adjusting the pressure in the main air chamber 314 is similar to changing a tender, and/or secondary springs, and/or the crossover spacers on a coil-over shock. Thus, adjusting the pressure in the main air chamber 314 will adjust ride height. In contrast, adjusting the pressure in the Evol chamber 322 is similar to changing a main spring on a coil-over shock, that is, it will help control bottom out and chassis roll.

Although the rear track shock assembly 38 in one embodiment is an air shock style shock assembly. In another embodiment, the rear track shock assembly 38 is a coil-over shock assembly, such as, for example, a FOX 2.0 zero QS3-R shock assembly with a velocity-sensitive shimmed damping system, one or more coil-over springs, a spring preload adjuster, and a reservoir. In another embodiment, the rear track shock assembly 38 may be another type of shock assembly such as, but not limited to, a stand-alone fluid damper assembly, a coil sprung adjustable shock assembly, an air sprung fluid damper assembly, or the like.

Referring still to FIG. 3A, in one embodiment, rear track shock assembly 38 includes a wireless controller 330 which receives data transmissions from user interface 205. In one embodiment, wireless controller 330 is coupled with the modal base valve 500.

In one embodiment, the modal base valve 500 is electronically actuated. In one embodiment, the modal base valve 500 is mechanically actuated. In one embodiment, the modal base valve 500 is both mechanically and electronically actuated.

In one embodiment, modal base valve 500 includes a wired communication capability. For example, in one embodiment, modal base valve 500 receives adjustment inputs from user interface 205 over a wired connection.

In one embodiment, modal base valve 500 includes a wireless communication capability. For example, in one embodiment, modal base valve 500 receives adjustment input(s) from user interface 205 via a wireless connection.

In one embodiment, modal base valve 500 and user interface 205 use a communication protocol such as, but not limited to, those disclosed in the communication protocol section herein. In one embodiment, the modal base valve 500 uses small and light componentry with a focus on both the minimizing of power requirements resulting in a long battery life and the minimizing of the weight/rotational inertia of the modal base valve.

Figure 3B:
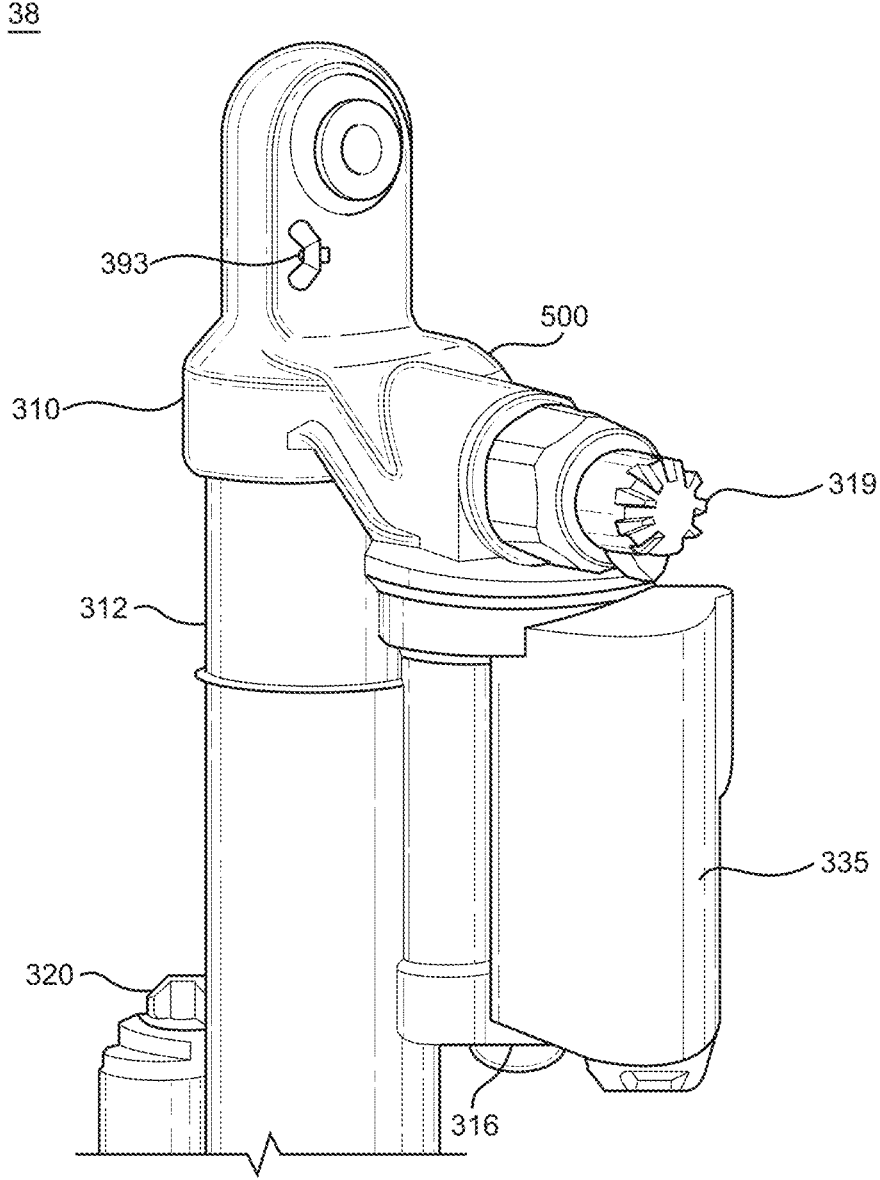
FIG. 3B is a perspective view of the top of the shock assembly with the wireless electronic modal base valve and a protective cover, in accordance with an embodiment.

In FIG. 3B, a perspective view of the top portion of the rear track shock assembly 38 with the electronic modal base valve 500 of FIG. 3A with the addition of a protective cover 335 provided about wireless controller 330 is shown in accordance with an embodiment.

Figure 4C:
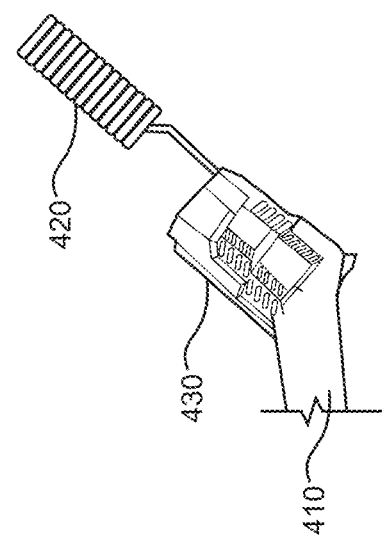
FIG. 4C is a perspective view of a wireless receiver and controller that may be coupled to the wires from wired electronic modal base valve of FIG. 4B, in accordance with an embodiment.
Figure 4B:
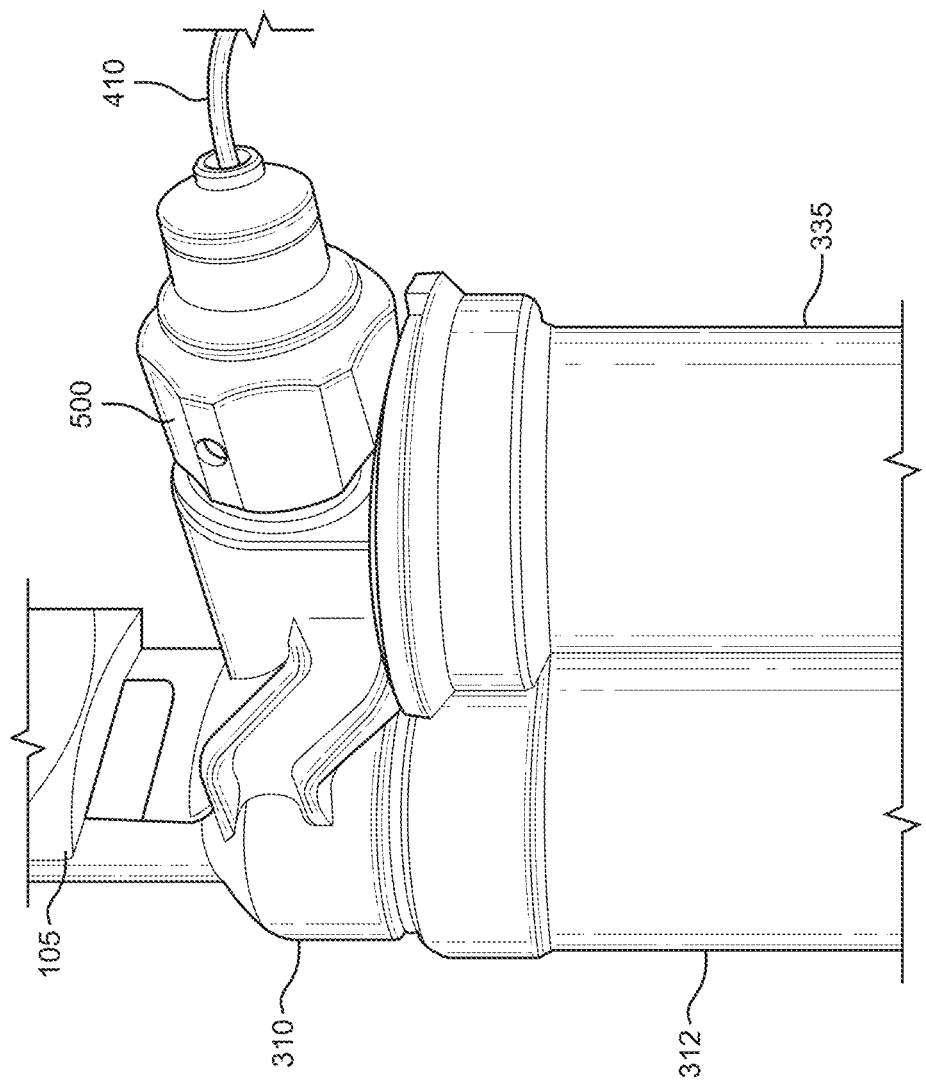
FIG. 4B is a perspective view of the shock assembly with a wired electronic modal base valve, in accordance with an embodiment.

With reference now to FIG. 4B, a perspective view of top portion of the rear track shock assembly 38 with the electronic modal base valve 500 of FIG. 3A, having a wire 410 extending from the electronic modal base valve 500 is shown in accordance with an embodiment.

In one embodiment, the wire 410 is the wired connection with user interface 205 (and/or controller 39, sensors, or other components such as, but not limited to, those shown in schematic 75).

In one embodiment, as shown in FIG. 4C, wire 410 of FIG. 4B is coupled with a wireless receiver 420 and controller module 430 which make up wireless controller 330, in accordance with an embodiment.

In one embodiment, one, some, or all of front shock assemblies 37 and/or front track shock assembly 36 include the same or similar components as described in the rear track shock assembly 38 discussion provided herein. However, as previously stated, the discussion uses examples based on the rear track shock assembly 38 for purposes of clarity.

Moreover, although components of FIGS. 3A, 3B, 4A, and 4B, are shown in given locations in accordance with one embodiment, in other embodiments, one, some, or all of the components shown in FIGS. 3A, 3B, 4A, and 4B could be located in other locations, one or more components could be separated into two or more pieces and dispersed, etc. The use of the locations of the components as shown in FIGS. 3A, 3B, 4A, and 4B are indicative of one embodiment, which is provided for purposes of clarity.

Figure 5A:
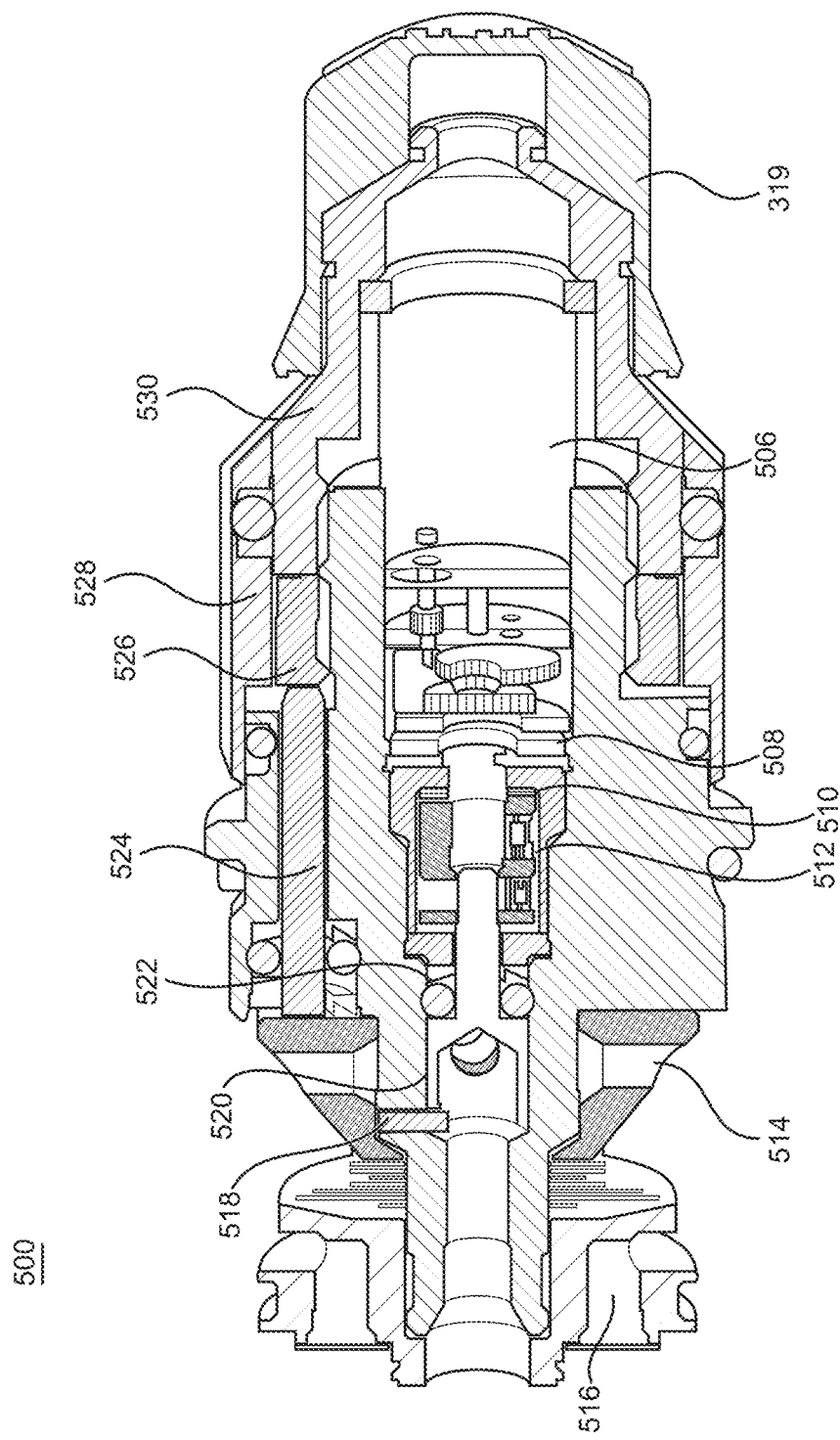
FIG. 5A is a cross-section view of a rotary spool style electronic modal base valve, in accordance with an embodiment.

Referring now to FIG. 5A, a cross-section view of a rotary spool style electronic modal base valve 500 is shown in accordance with an embodiment.

In one embodiment, rotary spool style electronic modal base valve 500 includes an end cap/preload ring stop 530, preload knob 528, threaded preload ring 526, preload pins 524, O-ring/Back up 522, removable wire routing/protective cap 319, motive component 506, coupled retaining ring 508, PRFE thrust washers 510, motive component coupler 512, preload plate 514, threaded piston 516, rotary spool 520 (or control valve-which in one embodiment is pressure balanced), and rotary spool stop 518 (or control valve movement limiter).

In one embodiment, the rotary spool 520 is designed such that the angular rotation between the closed state and the start of flow (and/or the open state and the beginning of the closing of the flow) is minimized. In one embodiment, the flow path through rotary spool 520 is circular. In another embodiment, the flow path through rotary spool 520 is another shape or combination of shapes. In one embodiment, instead of using a single sized flow path through rotary spool 520, a grid of holes are used as the flow path through rotary spool 520.

In one embodiment, rotary spool 520 has a throw of approximate 90 degrees between its open and closed positions. In one embodiment, the rotary spool 520 is a short throw valve where the difference between the open and the closed position is approximately 180 degrees or less. In one embodiment, the rotary spool 520 is a single rotation valve where the difference between the open and the closed position is approximately 360 degrees or less.

In one embodiment, the modal base valve 500 includes rotary spool 520 and a rotary motive component 506, such that all of the motion is rotary and as such, there is no need for any rotary to linear conversion. In other words, in one embodiment, there is no rotary to linear transmission required. E.g., there is no need to convert the rotating motion from a motor to linear actuation motion.

Therefore, in one embodiment, since modal base valve 500 relies only on rotational motion, no axial extension is needed other than the size of the modal base valve 500. In one embodiment, to provide an even smaller axial footprint, the output shaft from motive component 506 is used as to drive rotary spool 520.

In one embodiment, the feature of the rotary spool 520 that interfaces with rotary spool stop 518 is used to key the flow path through the rotary spool 520 to flow path 404.

In one embodiment, the rotary spool 520 of modal base valve 500 is (effectively) a two-state valve. In other words, the rotary spool 520 is an on/off component.

In one embodiment, motive component 506 is a brushed DC motor with a gearbox. In one embodiment, motive component 506 is a stepper motor, brushless motor, coreless motor, solenoid, or the like. In one embodiment, a control process is employed which controls the motor 506 ensuring it turn the rotary spool 520 the proper amount. In one embodiment, the control process does not require the use of visual indices, motion measurement tools, or the like.

Figure 5B:
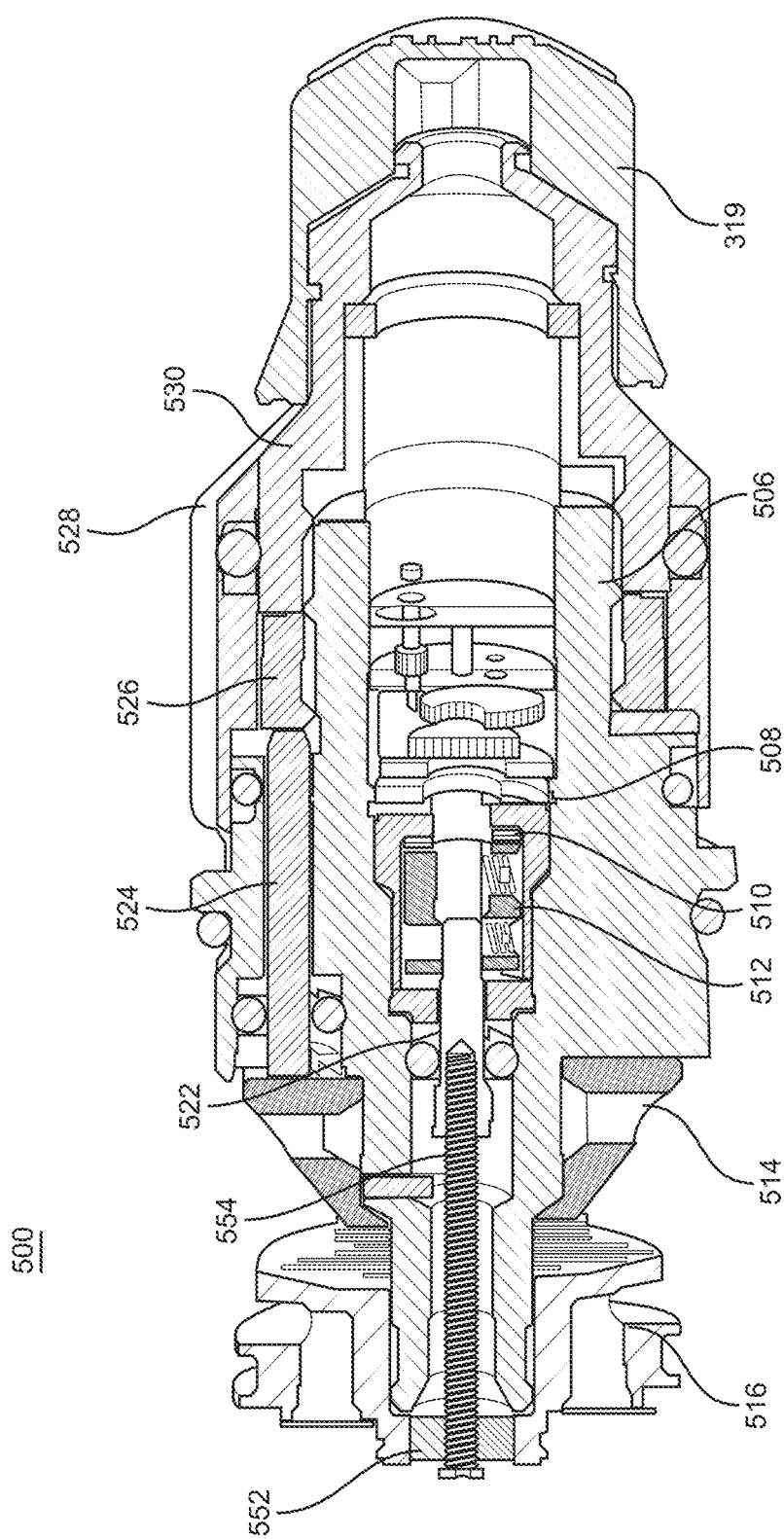
FIG. 5B is a cross-section view of a check shim style electronic modal base valve, in accordance with an embodiment.
Figure 5C:
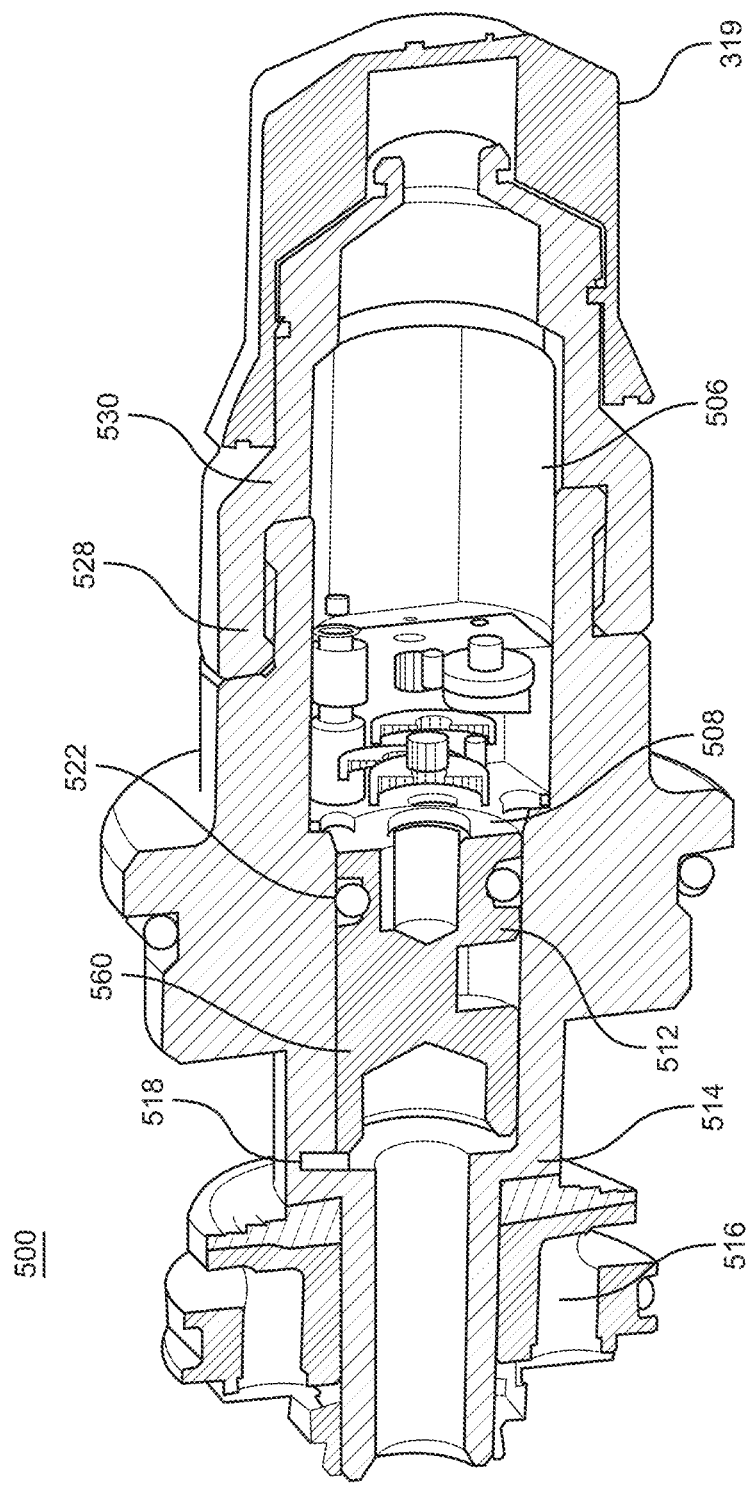
FIG. 5C is a cross-section view of a multi-state rotary spool style electronic modal base valve, in accordance with an embodiment
Figure 5E:
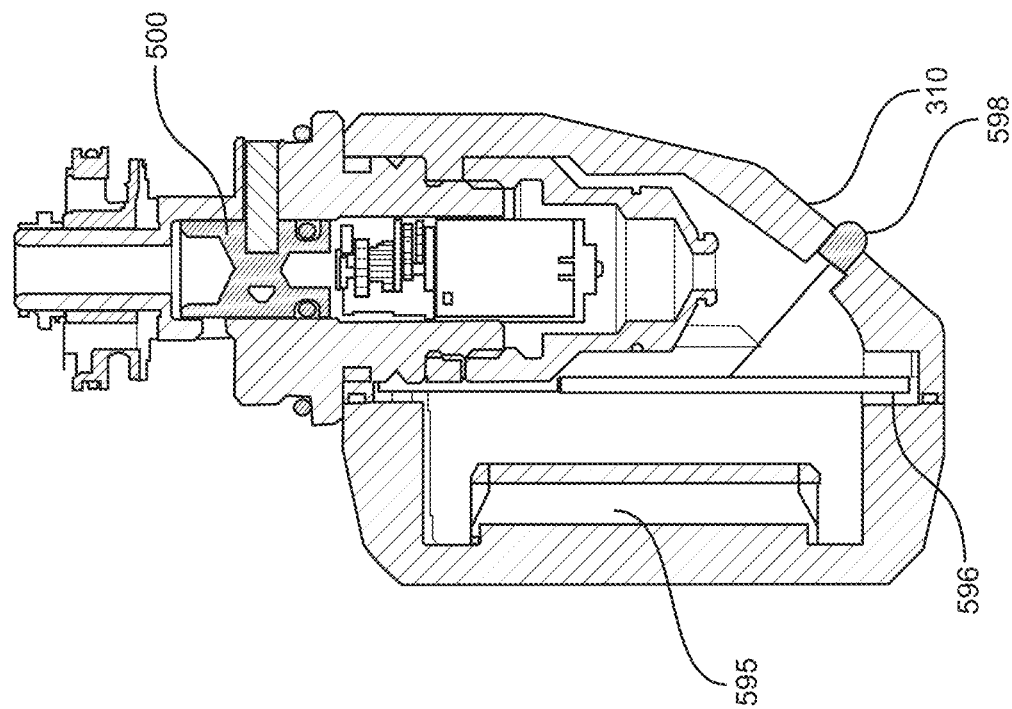
FIG. 5E is a cut-away view of a portion of rear track shock assembly with electronic modal base valve, in accordance with an embodiment.

With reference now to FIG. 5E, a cut-away view of a portion of rear track shock assembly 38 with electronic modal base valve 500, a power source 595, and a PCB 596 (which in one embodiment includes a microcontroller and motor controller) are shown in accordance with an embodiment. In one embodiment, FIG. 5E includes an LED 598.

With reference now to FIGS. 5A and 5E, in one embodiment, the control process utilizes the wireless radio (at the user interface 205), a microcontroller and a motor controller (in one embodiment, both the microcontroller and the motor controller are located other than user interface 205 and closer (if not physically coupled with) motor 506). In one embodiment, microcontroller and motor controller are located on the same PCB 596. In one embodiment, the wireless radio senses an actuation signal from the trigger unit (e.g., the user pushing one of the buttons or the like on user interface 205) which, in one embodiment, is mounted at handlebar 200. As described herein, the pushing of the button is used to indicate a desired change to the shock assembly tune. When the actuation signal is received from the user interface 205 to the microcontroller, the microcontroller sends a signal to the motor controller. In one embodiment, the motor controller allows power from the power source (such as 595 or the like) to be applied to the DC motor 506. In one embodiment, full voltage from the power source is supplied to the motor 506. In one embodiment, full voltage from the power source is supplied such that the motor 506 is spun as quickly as possible. In one embodiment, less than full voltage from the power source is supplied to the motor 506. In one embodiment, one or more components of the control process (e.g., microcontroller, motor controller, or the like) then monitor for a condition that occurs during the operation of motor 506 (e.g., current, proxy current, time, resistance, voltage, temperature, other sensors input, or the like) that satisfies a predetermined criteria. When the condition is met, the power to the motor 506 is removed.

For example, in one embodiment, as power is provided to the motor 506, the motor controller senses the current provided to the motor 506 using a circuit integrated into the motor controller. In general, the current (or other measurable aspect) varies over time (e.g., initially spiking to get the motor turning, then dropping while the valve moves, then spiking again when the valve is hits a hard stop). In one embodiment, the operating current provided to the motor 506 is compared to one or more pre-determined values (or current thresholds) stored in the memory of the microcontroller. In one embodiment, when the sensed current meets the predetermined threshold (e.g., a current threshold that represents motor stall), the microcontroller sends a signal to the motor controller to shut off the power to the motor 506. In one embodiment, this would complete an "closed" portion of the control strategy (e.g., closing the rotary spool 520) and lockout the shock assembly. In one embodiment, as long as the user depresses the button on user interface 205, this is all that occurs. That is, power is not required to keep the rotary spool 520 in its closed position.

In one embodiment, when the user selects a different suspension tune button on user interface 205, the reverse operation occurs to open rotary spool 520. That is, the wireless radio senses that new button being pushed. The microcontroller sends a signal to the motor controller to once again allow power to be provided to the motor 506, (however, in one embodiment, it is provided in an opposite polarity from that provided in the rotary spool 520 close operation to cause the motor 506 to rotate in the opposite direction). Once again, the current is sensed until the current threshold criteria is met, at which point the microcontroller sends a signal to the motor controller to shut off the power to the motor 506. In one embodiment, this would complete the "unlock" portion of the control strategy (e.g., opening the rotary spool 520). Once again, power is not required to hold the rotary spool 520 in its opened position.

In one embodiment, such as when the wireless control only utilizes the lockout feature, when the user interacts the user interface 205, a signal is sent from the user interface 205 to the modal base valve 500. As described in detail herein, the signal causes motive component 506 to rotate the rotary spool 520 within the modal base valve 500. The rotation of the rotary spool 520 causes the opening and/or closing of flow path 404 between body 312 and reservoir 316 at the location of the modal base valve 500 causing the rear track shock assembly 38 to either be put into a lockout condition or removed from a lockout condition.

In one embodiment, the use of the control process described herein to monitor and analyze the sensed current greatly reduces the complexity associated with the opening and closing of conventional electronically-actuated valves. For example, in one embodiment only two wires are required to be coupled to motor 506. In general, the two wires provide the power to motor 506, (e.g., completing a circuit between the power source and motor 506). In one embodiment, the microcontroller and/or motor controller would also be included in the circuit to control the flow of power from the power source to the motor 506.

In one embodiment, the current (or other measurable aspect) can be sensed at any desired location of the circuit. For example, in various embodiments, the current may be sensed at, but not limited to, any of the following locations, at or very near motor 506, at a location remote from motor 506, at the same location as the power source for motor 506, at a control unit (such as microcontroller and/or motor controller) which controls motor 506, at a control unit which controls other features on the vehicle (e.g., in one embodiment, the control unit is not required to control motor 506), and the like.

In one embodiment, there is a feature (such as a cutout, lip, arm, etc.) in a portion of the rotary spool 520 that interfaces with the rotary spool stop 518 to create a hard stop (or bump stop, or the like). In various other embodiment, other aspects, features, or the like maybe used as the stopping feature of the rotation of the rotary spool 520 (such as open, closed, or the like) which would cause a current threshold to be reached. In one embodiment, the hard stop is used to control the endpoint or endpoints of motor 506 with respect to moving/translating/rotating of some portion of rotary spool 520. Once the hard stop has restricted further moving/translating/rotating of rotary spool 520, the controller will sense a corresponding change in current (e.g., a current spike, a current drop, or other change in current) through motor 506. In one embodiment, based upon sensing the current change, the controller stops power from being provided to motor 506, or otherwise alters the power received by motor 506.

In one embodiment, instead of (or in addition to) the measuring and/or monitoring of a current threshold of the motor 506 to determine rotary spool 520 has reached a stopping point, other measuring devices such as timers, filters, thermometer, other sensors, and the like, may be used to measure time, resistance, voltage, temperature, noise, or the like. Here again, the control process is looking for a condition (e.g., current, proxy current, time, resistance, voltage, temperature, other sensors input, or the like) supplied to the motive component 506 that satisfies a predetermined criteria.

For example, if the motor 506 rotational rate for a given power is known, and the amount of desired rotation of the rotary spool 520 is also known, a timer or the like could be used to control the time the power is supplied to motor 506. For example, if motor 506 spins at a rate of 200 rpm and the rotary spool 520 needs to be rotated 180 degrees, then the timer would let the motor 506 operate for 0.15 seconds. In one embodiment, the timer and/or filters disclosed herein could also be used as back-up or confirmation settings to ensure against faults/transients such as where the stall current threshold is reached before the rotary spool 520 is completely open or completely closed. Thus, using any and/or all of these methods, there is no need to measure the position of the motor 506 directly.

As a significant advantage over conventional approaches, the various sensing embodiments, are not required to use visual indices, motion measurement tools, or the like, to determine that motor 506 has completed a desired movement/translation/rotation of rotary spool 520. As a result, embodiments do not require the additional complex features, additional wires (e.g., additional control wires between motor 506 and a controller dedicated and/or used to control motor 506). Instead, one embodiment is able to control motor 506 using the wires providing power to motor 506, or otherwise altering the power received by motor 506. Additionally, as physical space tends to be constrained in various vehicles, such as, for example, in the rear suspension of snowmobile 50, fewer wires and components will occupy far less physical space than is required by conventional electronically actuated suspension assemblies. Moreover, although the discussion above is provided in light of controlling a rear track shock assembly 38, other embodiments are well suited to being utilized in conjunction with different components such as, but not limited to, each of the front shock assemblies 37, the front track shock assembly 36, and various other vehicle components/features.

In one embodiment, although a wired connection between the motor controller and motor 506 is disclosed as one method for monitoring and or controlling the power to motor 506, other embodiments are well suited to using a wireless communication to communicate between, for example, the controller and motor 506.

With reference now to FIG. 5B, a cross-section view of a check shim style electronic modal base 500 is shown in accordance with an embodiment. In general, a number of the components of check shim style electronic modal base 500 are similar to those of rotary spool style electronic modal base valve 500 FIG. 5A, and as such, only the different components are discussed herein. The discussion of the components of FIG. 5B that are similar to those of FIG. 5A is not repeated for purposes of clarity, but is instead incorporated by reference in its entirety.

In the check shim style electronic modal base 500 instead of having rotary spool 520 (which in one embodiment is pressure balanced), and rotary spool stop 518, in one embodiment, check shim style electronic modal base 500 uses a lead screw 554 (control valve) and a check shim/guide 552 (or control valve movement limiter) to open or close the flow path 404.

With reference now to FIGS. 5B and 5E, in one embodiment, when the user interacts the user interface 205, a signal is sent from the user interface 205 to the modal base valve 500. As described in detail herein, the signal causes motive component 506 to move the lead screw 554 within the modal base valve 500. The movement of the lead screw 554 causes the opening and/or closing of flow path 404 between body 312 and reservoir 316 at the location of the modal base valve 500, thereby causing the rear track shock assembly 38 to either be put into a lockout condition or removed from a lockout condition.

In one embodiment, the operation of lead screw 554 with respect to the check shim/guide 552 is similar to that described with respect to the rotary flow operation of FIG. 5A. That is, check shim/guide 552 is used by a control system operating motive component 506 as part of a current limit type feedback system to control the operation and rotation of lead screw 554. For example, in one embodiment, when the motive component 506 is activated, it will run in one of two directions to turn lead screw 554 (either to open or close flow path 404). In one embodiment, when a feature on the lead screw 554 encounters check shim/guide 552 for a given direction of rotation, the lead screw 554 will stop rotating. This will cause a current increase in motive component 506 as it increases current to try to move the stopped lead screw 554.

As discussed above, in one embodiment, there is a pre-established current threshold that is based on motive component 506 continuing to try to rotate the lead screw 554 after the lead screw 554 has been stopped by check shim/guide 552. In one embodiment, when the control system operating motive component 506 determines the current threshold or current limit is met by the current requirements of motive component 506, the control system will shut off the power to motive component 506. In so doing, the check valve type electronic modal base valve 500 is able to quickly rotate the lead screw 554 without requiring any additional controllers, inputs, etc.

In one embodiment, lead screw 554 of modal base valve 500 is (effectively) a two-state valve. In other words, the lead screw 554 is an on/off component. In one embodiment, the lead screw 554 of modal base valve 500 may have intermediate states (to limit flow, such as a high flow, a medium flow, a slow flow, etc., but not at zero flow). For example, the lead screw 554 of modal base valve 500 could have intermediate settings to control flow. In one embodiment, there may be a control system (an encoder on motive component 506 with different settings thereon, etc.) to control/adjust the rotational location of the lead screw 554 into one or more intermediate states, (e.g., between on and off), to provide a regulated flow.

In one embodiment, the motive component 506 (e.g., solenoid, electric motor, stepper motor, or the like) of the modal base valve 500 receives power from a power source such as those described in the power source discussion included herein. In one embodiment, the power source is located locally with respect to rear shock assembly 38. In one embodiment, the power source is integrated with the wireless controller 330. In one embodiment, the power source is located at user interface 205 (and/or controller 39, power source 78, sensors, or other components such as, but not limited to, those shown in schematic 75).

In one embodiment, modal base valve 500 may include a mechanical actuator (e.g., a cable, hydraulic line, etc.) for mechanically actuating one or more components of the modal base valve 500. In general, the operation of modal base valve 500 would be similar to the operation described above, except for the change from a motive component 506 to electronically drive one or more components of the modal base valve 500, a mechanical actuator would be used to mechanically actuate one or more components of the modal base valve 500.

In one embodiment, the mechanical actuator 481 would provide a control capability such that a user input on a user interface 205 (or similar type device) would provide a mechanical actuation of the modal base valve 500 to change the lockout state of rear track shock assembly 38.

Referring now to FIG. 5C, a cross-section view of a multi-state rotary spool 560 of modal base valve 500 is shown in accordance with an embodiment. In general, multi-state rotary spool 560 of modal base valve 500 has a number of intermediate states (to limit flow, such as a high flow, a medium flow, a slow flow, etc.) between the closed state and the full-open state. In general, a number of the components of multi-state rotary spool 560 of modal base valve 500 are similar to those of rotary spool style electronic modal base valve 500 FIG. 5A, and as such, only the different components are discussed herein. The discussion of the components of FIG. 5C that are similar to those of FIG. 5A is not repeated for purposes of clarity, but is instead incorporated by reference in its entirety.

In one embodiment, multi-state rotary spool 560 of modal base valve 500 includes one or more intermediate settings in addition to the softest and the lockout positions to control flow.

Figure 5D:
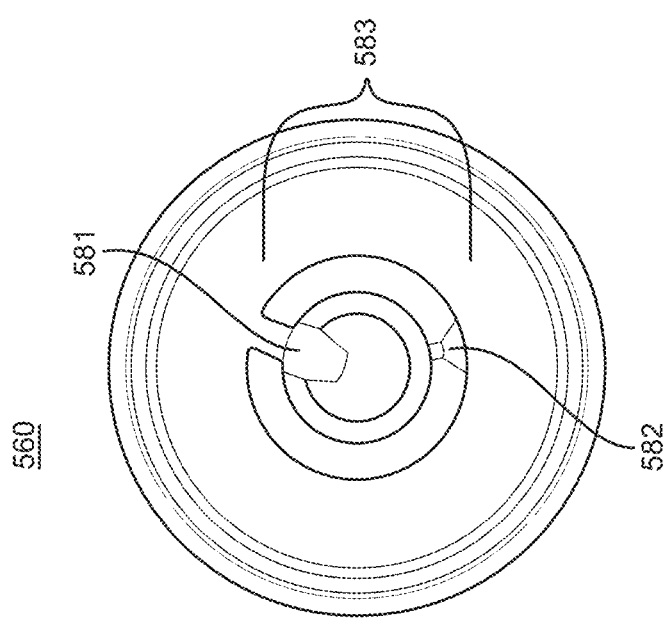
FIG. 5D is a front cut-away view of the multi-state rotary spool of FIG. 5C, in accordance with an embodiment.

With reference now to FIG. 5D, a front cut-away view of the multi-state rotary spool 560 is shown in accordance with an embodiment. In one embodiment, multi-state rotary spool 560 has a soft setting 581 feature, a lockout setting 582 feature, and a firmness range 583 that becomes increasingly firmer as the multi-state rotary spool 560 is rotated from the soft setting 518 to the lockout setting 582. In one embodiment, soft setting 581 feature is on one end stop and lockout setting 582 feature is on another end stop.

In one embodiment, soft setting 581 feature and lockout setting 582 feature are set 150 degrees apart. In another embodiment, they may be set at a different range. The use of 150 degrees is one embodiment and provided for purposes of clarity in the following examples.

With reference now to FIGS. 5C-5E, one embodiment of a control process is disclosed. In general, the control process for the valve of FIG. 5C is similar to that of the discussion of the control and operation of FIG. 5A. As such, it is not repeated for purposes of clarity.

In general, during operation, the controller may overshoot to each end stop to change between the soft setting 581 and lockout setting 582 of multi-state rotary spool 560 using the control and operation description provided in the discussion of FIG. 5A. In one embodiment, instead of (or in addition to) the measuring and/or monitoring of a current threshold of the motor 506 to determine multi-state rotary spool 560 has reached a stopping point, other measuring devices such as timers, filters, thermometer, other sensors, and the like, may be used to measure time, resistance, voltage, temperature, noise, or the like. Here again, the control process is looking for a condition (e.g., current, proxy current, time, resistance, voltage, temperature, other sensors input, or the like) supplied to the motive component 506 that satisfies a predetermined criteria.

In one embodiment, to obtain a middle firmness setting, a timer is used to time the operation of the motor such that it moves approximately half way between the soft setting 581 feature and lockout setting 582 feature in the firmness range 583. For example, if the motor 506 rotational rate for a given power is known, and the amount of desired rotation of the multi-state rotary spool 560 is also known, a timer or the like could be used to control the time the power is supplied to motor 506. For example, if motor 506 spins at a rate of 200 rpm and the multi-state rotary spool 560 needs to be rotated approximately 75 degrees, then the timer would let the motor 506 operate for 0.06 seconds. Thus, using any and/or all of these methods, there is no need to measure the position of the motor 506 directly to put the multi-state rotary spool 560 in a softest position, a middle firmness position, or a firmest (or locked out) position.

In one embodiment, the rebound valve can use similar valving as disclosed in FIGS. 5A-5E. In one embodiment, if the rebound valve is on the same shock assembly as the compression valve, the two valves may share one or more of the control components such as the power source, the microcontroller, and the like. In one embodiment, each active valve may have its own motor controller.

As stated above a significant advantage over conventional approaches, the various sensing embodiments, are not required to use visual indices, motion measurement tools, or the like, to determine that motor 506 has completed a desired movement/translation/rotation of multi-state rotary spool 560. As a result, embodiments do not require the additional complex features, additional wires (e.g., additional control wires between motor 506 and a controller dedicated and/or used to control motor 506). Instead, one embodiment is able to control motor 506 using the wires providing power to motor 506, or otherwise altering the power received by motor 506. Additionally, as physical space tends to be constrained in various vehicles, such as, for example, in the rear suspension of snowmobile 50, fewer wires and components will occupy far less physical space than is required by conventional electronically actuated suspension assemblies. Moreover, although the discussion above is provided in light of controlling a rear track shock assembly 38, other embodiments are well suited to being utilized in conjunction with different components such as, but not limited to, each of the front shock assemblies 37, the front track shock assembly 36, and various other vehicle components/features.

In one embodiment, although a wired connection between the motor controller and motor 506 is disclosed as one method for monitoring and or controlling the power to motor 506, other embodiments are well suited to using a wireless communication to communicate between, for example, the controller and motor 506.

In one embodiment, the microcontroller/Radio is a Feather M0 with RFM69HCW packet radio (433 MHz). In one embodiment, the motor controller is a DRV8833 2 channel controller with current limiting capabilities.

In one embodiment, the user interface 205 microcontroller/Radio is a Feather M0 with RFM69HCW packet radio (433 MHz). In one embodiment, user interface 205 includes a voltage regulator such as TSR-12450. In one embodiment, the buttons on user interface 205 are momentary switches.

In one embodiment, the status of power source 595 is displayed by LED 598. For example, in one embodiment, if power source 595 is running low, LED 595 may flash. Similarly, in one embodiment, user interface 205 may include an LED that provides status information such as which mode is selected, power source information, wireless connectivity status between user interface 205 and the one or more suspension components, and the like.

Figure 6:
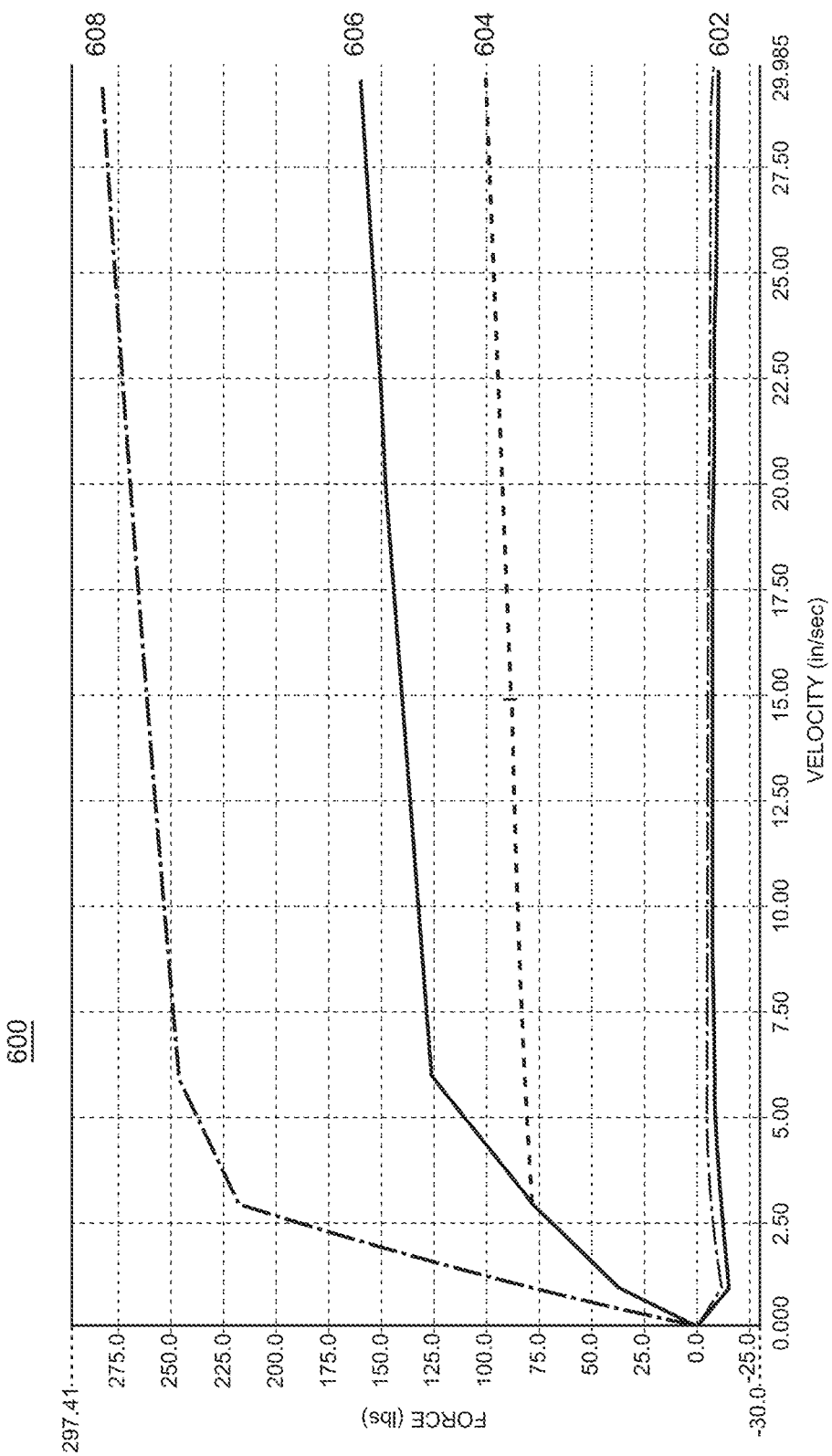
FIG. 6 is a graph showing the high-speed lockout performance of the rotary spool style electronic modal base valve of FIG. 5A, in accordance with an embodiment.

With reference now to FIG. 6, a graph 600 showing the high-speed lockout performance of the rotary spool style electronic modal base valve 500 of FIG. 5A is shown in accordance with an embodiment. Graph 600 is a velocity (in inches/second) versus force (in lbs.) analysis for the high-speed compression stroke of rear track shock assembly 38 at different settings of the rotary spool style electronic modal base valve 500.

In general, lines 602 shows an embodiment of the high-speed compression stroke of rear track shock assembly 38 when the rotary spool style electronic modal base valve 500 is in a softest compression state and the manual lockout is not engaged (e.g., rotary spool 520 is in an open state).

Line 604 shows an embodiment of the high-speed compression stroke of rear track shock assembly 38 when the rotary spool style electronic modal base valve 500 is in a firmer compression state (than that of the state shown in 602) and the manual lockout is still not engaged (e.g., rotary spool 520 is in an open state).

Line 606 shows an embodiment of the high-speed compression stroke of rear track shock assembly 38 when the rotary spool style electronic modal base valve 500 is in an even firmer compression state (than that of the state shown in 602 or 604) and the manual lockout is still not engaged (e.g., rotary spool 520 is in an open state).

Line 608 shows an embodiment of the high-speed compression stroke of rear track shock assembly 38 when the manual high-speed compression lockout adjustment feature of rotary spool style electronic modal base valve 500 is engaged (e.g., rotary spool 520 is in a closed state).

Figure 7:
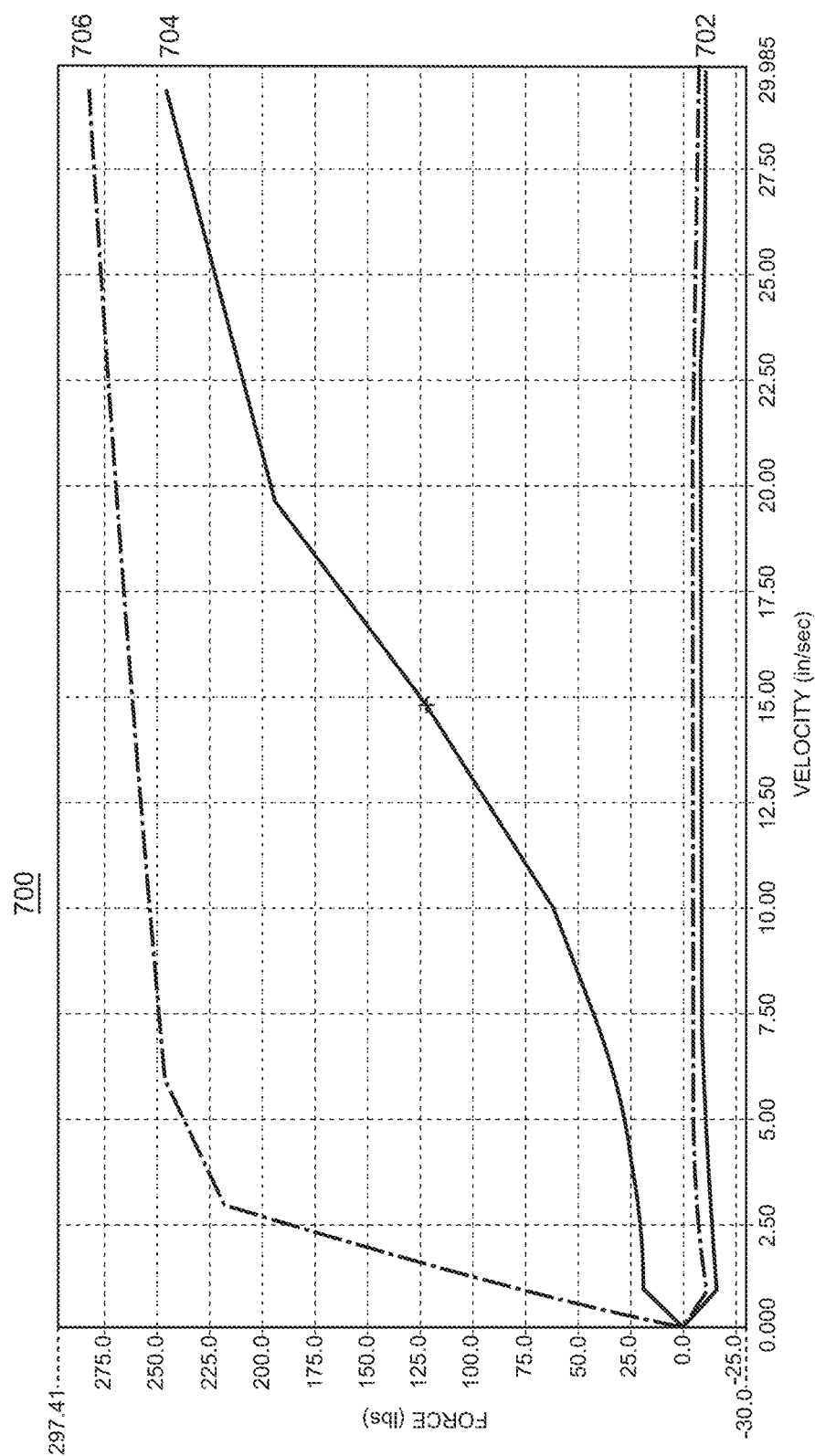
FIG. 7 is a graph showing the low-speed lockout performance of the rotary spool style electronic modal base valve of FIG. 5A, in accordance with an embodiment.

With reference now to FIG. 7, a graph 700 showing the low-speed lockout performance of the rotary spool style electronic modal base valve of FIG. 5A is shown in accordance with an embodiment. Graph 700 is also a velocity (in inches/second) versus force (in lbs.) analysis but this time for the low-speed compression stroke of rear track shock assembly 38 at different settings of the rotary spool style electronic modal base valve 500.

In general, lines 702 shows an embodiment of the low-speed compression stroke of rear track shock assembly 38 when the rotary spool style electronic modal base valve 500 is in a softest compression state and the manual lockout is not engaged (e.g., rotary spool 520 is in an open state).

Line 704 shows an embodiment of the low-speed compression stroke of rear track shock assembly 38 when the rotary spool style electronic modal base valve 500 is placed in a lockout state via the iQS switch 210 but the manual lockout is not engaged (e.g., rotary spool 520 is in an open state).

Line 706 shows an embodiment of the low-speed compression stroke of rear track shock assembly 38 when the rotary spool style electronic modal base valve 500 is placed in a lockout state via both the iQS switch 210 and the manual lockout is engaged (e.g., rotary spool 520 is in a closed state).

Figure 8:
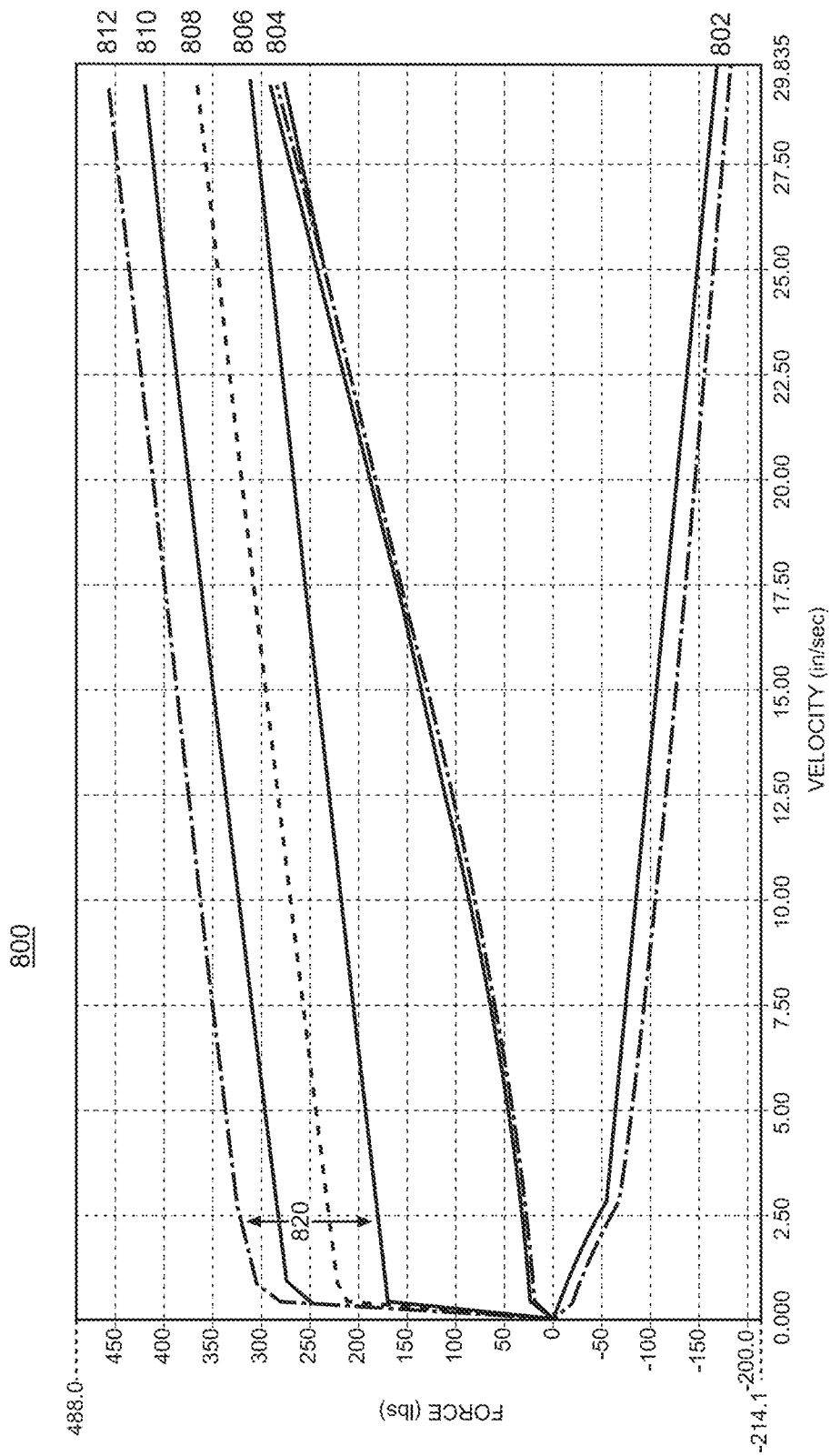
FIG. 8 is a graph showing the low-speed lockout performance of the rotary spool style electronic modal base valve of FIG. 5B, in accordance with an embodiment.

With reference now to FIG. 8, a graph 800 showing the low-speed lockout performance of the check shim style electronic modal base valve of FIG. 5B is shown in accordance with an embodiment. Graph 800 is a velocity (in inches/second) versus Force (in lbs.) analysis for the low-speed compression stroke of rear track shock assembly 38 at different settings of the check shim style electronic modal base valve of FIG. 5B, in accordance with an embodiment.

In general, lines 802 shows an embodiment of the low-speed compression stroke of rear track shock assembly 38 when the check shim style electronic modal base valve 500 is in a softest compression state and the manual lockout is not engaged (e.g., lead screw 554 is in an open state and not blocking flow path 404).

Lines 804 shows an embodiment of the low-speed compression stroke of rear track shock assembly 38 when the check shim style electronic modal base valve 500 is placed in a lockout state via the iQS switch 210 but the manual lockout is not engaged (e.g., lead screw 554 is in an open state and not blocking flow path 404).

Lines 806-812 show different embodiments of the low-speed compression stroke of rear track shock assembly 38 when the check shim style electronic modal base valve 500 is placed in a lockout state via both the iQS switch 210 and the manual lockout is engaged (e.g., lead screw 554 is in a closed state blocking flow path 404). In one embodiment, the difference shown by lines 806 through 812 are based on differences in preload 820 of rear track shock assembly 38. In general, line 806 is illustrative of the lowest preload 820 setting of rear track shock assembly 38 that is on the graph. Line 808 is illustrative of the higher preload 820 setting of rear track shock assembly 38 that that used in the measurement of line 806. Line 810 is illustrative of the higher preload 820 setting of rear track shock assembly 38 that that used in the measurement of either line 806 of line 808. Line 812 is illustrative of the highest preload 820 setting of rear track shock assembly 38.

Power Source

In one embodiment, one, some, or all of electronically actuated components, interactive components, and/or control features such as one or more of: user interface 205, active and/or semi-active shock assemblies (e.g., front track shock assembly 36, rear track shock assembly 38, and front shock assemblies 37), controller 39, one or more sensor(s), a display, smart components, and the like, will use a power source.

In one embodiment, one power source could be used to power a plurality of components. For example, power source 78 may be used as a power source for one, some, or all of the user interface 205, active and/or semi-active shock assemblies (e.g., front track shock assembly 36, rear track shock assembly 38, and front shock assemblies 37), controller 39, one or more sensor(s), a display, smart components, and the like.

In one embodiment, one power source could be used to power a plurality of components, while other of the components would have their own power source. For example, power source 78 may be used as a power source for a plurality of components such as any combination of one or more of the user interface 205, active and/or semi-active shock assemblies (e.g., front track shock assembly 36, rear track shock assembly 38, and front shock assemblies 37), controller 39, one or more sensor(s), a display, smart components, and the like. While the remaining one or more of the user interface 205, active and/or semi-active shock assemblies (e.g., front track shock assembly 36, rear track shock assembly 38, and front shock assemblies 37), controller 39, one or more sensor(s), a display, smart components, and the like would each have their own power source.

In one embodiment, each of the user interface 205, active and/or semi-active shock assemblies (e.g., front track shock assembly 36, rear track shock assembly 38, and front shock assemblies 37), controller 39, one or more sensor(s), a display, smart components, and the like, would have its own power source.

In one embodiment, there may be a plurality of power sources shared by any combination of one or more of the user interface 205, active and/or semi-active shock assemblies (e.g., front track shock assembly 36, rear track shock assembly 38, and front shock assemblies 37), controller 39, one or more sensor(s), a display, smart components, and the like. For example, in one embodiment, user interface 205 and rear track shock assembly 38 would share a power source.

In one embodiment, the power source is integrated with a component, and as such, is not easily or readily removable without some amount of disassembly. For example, the power source may be integrated into user interface 205, active and/or semi-active shock assemblies (e.g., front track shock assembly 36, rear track shock assembly 38, and front shock assemblies 37), controller 39, one or more sensor(s), a display, smart components, and the like. As such, the power source would either have to be replaced during a disassembly procedure, be designed to last for a given amount of time, be wired or wirelessly rechargeable in place, or the like. For example, in one embodiment, the component might have a charging port that allows a charger to connect with the power source integrated therein.

In one embodiment, the power source is removably coupled with one or more components such that it can be removed, replaced, or the like. For example, the power source would be located in an accessible location, such as inside protective cover 335 or in a housing such as on one or more of the user interface 205, active and/or semi-active shock assemblies (e.g., front track shock assembly 36, rear track shock assembly 38, and front shock assemblies 37), controller 39, one or more sensor(s), a display, smart components, and the like. In one embodiment, by being removably coupled with one or more components, the power source can be removed by a user for replacement, storage, charging, security (e.g., so it is not stolen), and the like.

In one embodiment, one or more power sources may be externally mounted on the frame and/or one or more other components of the snowmobile. In one embodiment, the power source could be externally mounted such that it is easily and/or quickly removable for charging, replacement, storage, and/or security. In one embodiment, the power source could be externally mounted such that it is not easily and/or quickly removable for charging, replacement, storage, and/or security.

In one embodiment, one or more power sources may be internally mounted on the frame and/or one or more other components of the snowmobile. In one embodiment, the power source could be internally mounted such that it is easily and/or quickly removable for charging, replacement, storage, and/or security. In one embodiment, the power source could be internally mounted such that it is not easily and/or quickly removable for charging, replacement, storage, and/or security.

In one embodiment, the power source could be a power source that is not dedicated to any of the components discussed herein. For example, if power source 78 is the main battery (or a power source for a light, for controlling a suspension state (e.g., raising or lowering the starting point of a front shock, raising or lowering the starting point of a rear shock), for a vehicle display (such as an IVI), for an electronic transmission, starter, seat warmer, etc.) it would have a primary functionality of providing power to the snowmobile (or other component). As such, it may not be considered a dedicated battery for any other components. However, in one embodiment, the main battery may be used as a power source for one, some, or all of the user interface 205, active and/or semi-active shock assemblies (e.g., front track shock assembly 36, rear track shock assembly 38, and front shock assemblies 37), controller 39, one or more sensor(s), a display, smart components, and the like.

In one embodiment, the power source is comprised of a power station or power pack. In one embodiment, the power source is a non-rechargeable battery such as, but not limited to, one or more of a CR2032 battery, a double A battery, a triple A battery, a lithium coin cell battery, a silver oxide cell battery, or the like.

In one embodiment, the power source is a rechargeable battery such as, but not limited to, a lithium-ion battery. In one embodiment, the power source can be recharged wired or wirelessly. For example, a power source having a wirelessly rechargeable capability means it could be charged using a wireless power transfer system. E.g., using an inductive charger (or the like) within a given distance of the wirelessly rechargeable capability of the power source. Wireless charging, in its most basic form utilizes a copper coil to create an oscillating magnetic field, which can create a current in one or more receiver antennas. In general, the wireless charger could be a charging pad that use tightly-coupled electromagnetic inductive or non-radiative charging; A charging bowl or through-surface type charger that uses loosely-coupled or radiative electromagnetic resonant charging to transmit a charge a few inches; An uncoupled radio frequency wireless charger that allows a trickle charging capability at distances of many feet, or the like.

Examples of a wireless power transfer systems that could be used in one or more embodiments include those defined by the wireless power consortium (WPC) Qi standard, the AirFuel Alliance (e.g., Duracell Powermat, PowerKiss, etc.), WiTricity, and the like.

In one embodiment, by using wireless power transfer, the power source can be charged even though if it is sealed within a component. In one embodiment, the power source can be charged while the component is installed on the snowmobile 50. In one embodiment, the wireless power transfer capability is dependent upon factors such as, material type (e.g., composite, metal, thin, thick, etc.), the type of wireless power transfer being used, etc.

In one embodiment, the power source is an energy harvesting switch that does not require a battery or other powered connection. As such, the energy harvesting switch is capable of operating for an indefinite amount of time without requiring any type of recharge, battery change, etc. For example, in one embodiment, the energy harvesting switch utilizes a momentary generator such as ZF electronics AFIG-0007 to provide power.

In one embodiment, the power source is a combination or hybridization of two or more of the replaceable battery, the rechargeable battery, the energy harvesting switch, and the like.

In one embodiment, and as a significant advantage over conventional approaches, the various power source location and/or configuration embodiments described herein eliminate the need for a user/rider to keep track of, or otherwise monitor, the power level of the power source at the component being powered. Instead, the user/rider is able to remove and "plug in" the power source, for example, after use of the snowmobile and the power source will be fully recharged. Upon recharging, the power source is replaced on the snowmobile, and the rider/user is assured that ample power will be provided to the component (or components being powered), E.g., the dropper seatpost 300, a controller, and/or various other components/features of the snowmobile.

Communications Protocol

In one embodiment, one, some, or all of the user interface 205, active and/or semi-active shock assemblies (e.g., front track shock assembly 36, rear track shock assembly 38, and front shock assemblies 37), controller 39, one or more sensor(s), a display, smart components, and the like, have wired and/or wireless communication capabilities and can communicate with one or more of the other components over the wired network, over a wireless network, or over a hybrid wired and wireless network.

The wireless network is selected from one or more of: a wireless personal area network (WPAN), a low power network (LPAN), Internet of things (IoT) connectivity, or the like. In one embodiment, the wireless communication protocol could be, but is not limited to, Bluetooth, WiFi, Bluetooth Low Energy (BLE), near field communication (NFC), UHF radio signal, Worldwide Interoperability for Microwave Access (WiMax), long-term evolution (LTE), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

In one embodiment, one, some, or all of the user interface 205, active and/or semi-active shock assemblies (e.g., front track shock assembly 36, rear track shock assembly 38, and front shock assemblies 37), controller 39, one or more sensor(s), a display, smart components, and the like, could form a wireless mesh, such as a snowmobile area network (SAN) or the like. In one embodiment, one or more components of the SAN could interact with the user/rider in any number of ways such as via touch, sound, vision, radio, wearable, and the like.

In one embodiment, the components within the wireless mesh may include an auxiliary or propriety private network encryption such as AES 128. In one embodiment, the AES-128 block cipher is operated in the Authenticated Encryption with Associated Data (AEAD) scheme, which allows encrypting the given plaintext, and authenticating associated plain text data. The AEAD scheme requires a 13-byte nonce value, referred to herein as AEADNonce. When the AES-128 symmetric key, and AEADNonce are unique for every packet, the connection is secured.

In one embodiment, the AEADNonce is constructed by concatenating the nonce of each device with the sequence number of the particular packet, for a total of 12 bytes, with the 13th byte padded with 00. This ensures the AEADNonce is unique, and the connection is therefore secure.

In one embodiment, one or more components within the wireless mesh may include communication protocols for one or more peers, such as an out-of-SAN wireless device that doesn't want to share its network. In this case, the out-of-SAN wireless device can provide a hardware interface and it can be piped into the SAN. Thus, in one embodiment, the wireless mesh network can be used to connect and/or control almost any wireless aspect, as the network, topology, and features thereof are well suited to interacting with basic device operating structures.

In one embodiment, information broadcast from a given component will include a unique identifier (ID) that identifies the specific component that made the broadcast. Thus, even when a number of different components are operating in the same environment, the controller 39 (or one or more of the other components) will be able to identify which component sent the signal based on the unique ID. In one embodiment, the unique ID is used during the programming/pairing of the components with controller 39 and/or the network.

In one embodiment, the unique ID is used to validate the sending component. Although a unique ID is used in one embodiment, in another embodiment, a different identification methodology may be used to identify the different components in the network. In one embodiment, the wireless network is an intra-vehicle wireless network (such as a SAN) for data transmission between at least two components coupled with the vehicle, the at least two components including, but not limited to, the user interface 205, active and/or semi-active shock assemblies (e.g., front track shock assembly 36, rear track shock assembly 38, and front shock assemblies 37), controller 39, one or more sensor(s), a display, smart components, and the like, coupled with the vehicle. In one embodiment, the intra-vehicle wireless network is a wireless mesh network. In one embodiment, the intra-vehicle wireless network includes an intra-vehicle transmission authentication and encryption protocol.

In one embodiment, the broadcast information or data (e.g., message payload) will include additional information/data comprising the wireless network which is passed to and from peripheral devices in the network. Thus, in one embodiment, the wireless network communication and/or wireless mesh network will allow for information/data to be exchanged between adjacent vehicles, vehicle networks, etc.

In one embodiment, the wireless network includes an inter-vehicle communication (IVC) wireless network for data transmission between the vehicle and at least another vehicle, between the vehicle and a mobile communications device distinct from the vehicle, between the vehicle and an infrastructure component (such as a traffic light, beacon on a stop sign, road mile marker, a benchmark, or the like). In one embodiment, the IVC wireless network is a wireless mesh network. In one embodiment, the IVC wireless network includes an IVC transmission authentication and encryption protocol.

The IVC transmission authentication and encryption protocol can be distinct and different from the intra-vehicle transmission authentication and encryption protocol, such that a device receiving a communication can determine the origin of the communication. Often, the origin of the communication is important depending upon the data provided in the communication. For example, a transmission that includes sensor provided information might only be verified and acted upon if it includes the intra-vehicle transmission authentication and encryption protocol (such as for security purposes or the like).

In one embodiment, the IVC transmission authentication and encryption protocol can include levels of trust. For example, a vehicle used by a friend may have a "trusted" IVC transmission authentication and encryption protocol that allows a sensor from the friend's vehicle to provide information to a component on the user's machine, information that is verified and acted upon as sensor data from a "trusted" peripheral. In contrast, when an IVC transmission includes sensor provided information but it does not have a "trusted" IVC transmission authentication and encryption protocol it would not be verified and acted upon. However, other information such as stop sign warnings, terrain changing information, or the like from IVC transmissions would be evaluated by one or more components of the user's machine and may be used depending upon context, or the like.

In one embodiment, communication protocol is designed for low latency and long battery life. In one embodiment, the network implements the proprietary low-latency low-power radio protocol to provide an effective transport for communication between modal base valve 500 and user interface 205.

In one embodiment, the wireless signal is a "telegram" or the like that includes the unique identifier (ID) that identifies the component that broadcast the telegram signal. Thus, even when several devices are operating in the same environment, the telegram signal will identify which device sent the signal. Although the unique ID is used in one embodiment, in another embodiment, a different portion of the telegram signal is used to identify the transmitting device.

In one embodiment, one or more components will periodically send a heartbeat (e.g., check-in message), to inform one or more of the other components that they are still active. In one embodiment, the heartbeat is sent at a 1 Hz communication rate. In one embodiment, the component that received, but did not send, the heartbeat will provide a response message to confirm that there is a wireless connection therebetween.

In one embodiment, a timer is used to count down a check-in or heartbeat time period. In one embodiment, the time period measured by the timer is preset by the manufacturer. In one embodiment, the time period measured by the timer is adjustably set by the manufacturer, by the user, by a mechanic, based on the vehicle location, terrain type, or the like.

In one embodiment, when the timer expires, the heartbeat is sent. In one embodiment, once the wireless communication is confirmed, the timer will be restarted.

In one embodiment, if there is no response to the heartbeat with a predefined period of time, another heartbeat will be sent. In one embodiment, if there is still no response received, an additional pre-defined number of heartbeat signals will be sent.

In one embodiment, one or more of the components can be in a number of different energy states to conserve battery life. Although a number of states are discussed, in one embodiment there may be more, fewer, or a different combination or variation of the described energy states. The use of the disclosed energy states is provided herein as one embodiment and for purposes of clarity.

One state is referred to as the operating state. This is the highest battery power consumption state. In the operating state, the component is transmitting and/or receiving data.

In a standby state, the component is awake and there is a connection therebetween. For example, in the standby state, the user interface 205 is waiting to receive input from the user. When the user provides an input, user interface 205 will move into the operating state and transmit the data to modal base valve 500.

In one embodiment, when modal base valve 500 responds to the transmission from user interface 205, it will be known to both devices that there is a connection therebetween, that the signal has been received by modal base valve 500, and that one or both the modal base valve 500 and/or the user interface 205 can return to the standby state until the next time the user provides an input to user interface 205.

In one embodiment, the modal base valve 500 may not provide a response to the transmission from user interface 205. In one embodiment, user interface 205 may not expect a response from modal base valve 500 after user interface 205 sends the transmission.

In one embodiment, the modal base valve 500 may only provide the heartbeat message to the user interface 205 at pre-defined intervals to evidence the connection between user interface 205 and modal base valve 500.

In one embodiment, if user interface 205 expected but did not receive a response from modal base valve 500, user interface 205 will include a programmed pre-defined number of attempts at transmitting the signal to modal base valve 500 before making the determination that there is a disconnection in the communication between the user interface 205 and the modal base valve 500.

In one embodiment, such as after a period of inaction, or the user interface 205 determines that the snowmobile is not being ridden (e.g., based on a user input, a sensor input, or the like), such as for example, in one embodiment, a vibration sensor will determine that the snowmobile is stationary, the user interface 205 will send a standby message to inform modal base valve 500 and/or any active components that the snowmobile is not being ridden. In one embodiment, the modal base valve 500 and/or any active components will transition to a low-power mode or sleep mode when the standby message is received.

In one embodiment, once the modal base valve 500 and/or any active components user interface 205 is turned off (or otherwise not responding), modal base valve 500 and/or any active components will enter a no-heartbeat standby state (e.g., an intermediate battery power consumption state), where modal base valve 500 and/or any active components is awake and listening but is not sending any transmissions (e.g., heartbeat transmissions, etc.).

In one embodiment, modal base valve 500 and/or any active components will remain in the no-heartbeat standby state until the connection with user interface 205 is re-established. In one embodiment, when modal base valve 500 and/or any active components receives a message from user interface 205, it will know that the connection with user interface 205 is established (or re-established) and modal base valve 500 and/or any active components will transition from the no-heartbeat standby state to a heartbeat standby state.

In a dormant state, the snowmobile is stationary. For instance, the snowmobile is in storage or otherwise parked and not being ridden. In one embodiment, when in the dormant state, active components such as the user interface 205, modal base valve 500, and/or any other active (or power consuming) components, will go into low-power mode. In one embodiment, while in the dormant state, modal base valve 500 and/or any active components will periodically wake up to transmit a signal to user interface 205. If no response is received, modal base valve 500 and/or any active components will return to the dormant state, e.g., go back to sleep.

In contrast, if modal base valve 500 and/or any active components receives a response from user interface 205 during the periodic wakeup, in one embodiment, modal base valve 500 and/or any active components will change from the dormant state into the standby state.

In one embodiment, while in the dormant state, when motion is detected, the vibration sensor will wake the microcontroller on the user interface 105 (or in another embodiment, on the shock assembly, on another active component, or the like) which will then transmit a wake-up signal to the other components. In one embodiment, the wake-up signal will be transmitted a number of times over a given time period (e.g., a time period longer than the periodic wakeup time period to ensure the other components receive the wake-up transmission.

In one embodiment, while in the dormant state, when motion is detected, the vibration sensor will wake the microcontroller on a number of components such as user interface 105, the shock assembly, and/or another active component. In one embodiment, a user may interact with a component such as a button on user interface 205 (or turning a key to an on position, pushing a start button, operating the throttle, bouncing the suspension, or the like) which will cause the components to wake from the dormant state.

Thus, in one embodiment, the modal base valve 500, any active components, and/or the user interface 205 can move between the different states fluidly using the model described above. In one embodiment, the modal base valve 500, any active components, and/or the user interface 205 will try to remain in (or return to) the lowest powered state for the specific situation.

In one embodiment, the power draw for each state is approximated as an average of 150 microamp draw during the active state, an average of 32 microamp draw during either standby state, and an average of 1 microamp draw during the dormant state.

In one embodiment, for example when the power source is a battery such as a CR2032, the capacity is approximately 173 mAh. As such, and based on the power draw for each state, the expected battery life of the battery of the modal base valve 500, any active components, and/or the user interface 205 is a number of months. In one embodiment, depending upon the duty cycle, the lifespan of the battery will be different.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. An electronic modal base valve for a shock assembly comprising:
    a motive component;
    a controller communicatively coupled with said motive component; and
    a control valve coupled with said motive component, wherein said controller is configured to control an operation of said motive component, wherein a movement of said motive component is configured to cause said control valve to adjust a flow rate for a flow path through said electronic modal base valve, wherein said control valve is a rotary spool valve, and wherein said motive component is rotary based such that all of the motion of said motive component is rotary and said electronic modal base valve does not require a conversion between rotary movement and linear movement.

2. The electronic modal base valve of claim 1, further comprising:
    a user interface located remote from said electronic modal base valve, said user interface to provide a wireless signal to said controller, said wireless signal to cause said controller to initiate said operation of said motive component.

3. The electronic modal base valve of claim 1, further comprising:
    a user interface located remote from said electronic modal base valve, said user interface comprising a wired connection with said electronic modal base valve, said user interface to provide a wired signal to said controller, said wired signal to cause said controller to initiate said operation of said motive component.

4. The electronic modal base valve of claim 1, wherein said control valve is a two-state valve.

5. The electronic modal base valve of claim 1, wherein said control valve is a multi-state valve.

6. The electronic modal base valve of claim 1, wherein said electronic modal base valve is a dual-speed compression (DSC) valve.

7. The electronic modal base valve of claim 1, wherein said electronic modal base valve is a rebound valve.

8. An electronic valve for a shock assembly comprising:
a low-speed compression adjuster;
a high-speed compression adjuster; and
a manual command lockout, wherein said manual command lockout comprises:
   a motive component; and
   a control valve coupled with said motive component, wherein said motive component causes said control valve to open or close a flow path through said electronic valve, wherein said control valve is a rotary spool valve, and wherein said motive component is rotary based such that all motion of said motive component is rotary and said electronic valve does not require a conversion between rotary movement and linear movement.

9. The electronic valve of claim 8, further comprising:
a user interface located remote from said electronic valve, said user interface to provide a wireless signal to said manual command lockout, said wireless signal to cause an operation of said motive component.

10. The electronic valve of claim 8, further comprising:
a user interface located remote from said electronic valve, said user interface comprising a wired connection with said electronic valve, said user interface to provide a wired signal to said manual command lockout, said wired signal to cause an operation of said motive component.

11. The electronic valve of claim 8, wherein said control valve is a rotary spool valve.

12. The electronic valve of claim 8, wherein said control valve is a check shim valve.

13. The electronic modal DSC base valve of claim 8, wherein said control valve is a multi-state valve.

14. The electronic valve of claim 8, further comprising:
said motive component coupled with said low-speed compression adjuster to cause a compression adjustment to be performed by said low-speed compression adjuster; and
said motive component coupled with said high-speed compression adjuster to cause a compression adjustment to be performed by said high-speed compression adjuster.

15. The electronic valve of claim 14, further comprising:
a user interface located remote from said electronic valve, said user interface to provide a signal to said motive component, said signal to cause said motive component to adjust at least one of said low-speed compression adjuster and said high-speed compression adjuster.

16. An electronic modal dual-speed compression (DSC) base valve for a shock assembly comprising:
a motive component;
a controller to control said motive component;
a low-speed compression adjuster coupled with said motive component, wherein said motive component is configured to cause a compression adjustment to be performed by said low-speed compression adjuster;
a high-speed compression adjuster coupled with said motive component, wherein said motive component is configured to cause a compression adjustment to be performed by said high-speed compression adjuster;
a manual command lockout, wherein said manual command lockout comprises:
   a control valve coupled with said motive component, wherein said motive component is configured to cause said control valve to open or lockout a flow path through said electronic modal DSC base valve; and
wherein said control valve is a rotary spool valve, and wherein said motive component is rotary based such that all of the motion of said motive component is rotary and said modal dual-speed compression (DSC) base valve does not require a conversion between rotary movement and linear movement.

17. The electronic modal DSC base valve of claim 16, further comprising:
a user interface located remote from said electronic modal DSC base valve, said user interface to provide a wireless signal to said controller, said wireless signal to cause said motive component to adjust at least one of said low-speed compression adjuster, said high-speed compression adjuster, and said control valve.

18. The electronic modal DSC base valve of claim 16, further comprising:
a power source, said power source coupled with said motive component.

\* \* \* \* \*